US010645007B2

(12) United States Patent
Faccin et al.

(10) Patent No.: US 10,645,007 B2
(45) Date of Patent: May 5, 2020

(54) QUALITY OF SERVICE (QOS) MANAGEMENT IN WIRELESS NETWORKS

(71) Applicant: QUALCOMM Incorporated, San Diego, CA (US)

(72) Inventors: Stefano Faccin, San Ysidro, CA (US); Gavin Bernard Horn, La Jolla, CA (US); Soo Bum Lee, San Diego, CA (US); Haris Zisimopoulos, London (GB); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/134,797

(22) Filed: Sep. 18, 2018

(65) Prior Publication Data

US 2019/0020590 A1   Jan. 17, 2019

Related U.S. Application Data

(62) Division of application No. 15/275,170, filed on Sep. 23, 2016, now Pat. No. 10,277,515.

(Continued)

(51) Int. Cl.
*H04L 12/813* (2013.01)
*H04L 12/927* (2013.01)
(Continued)

(52) U.S. Cl.
CPC .......... *H04L 47/20* (2013.01); *H04L 47/2433* (2013.01); *H04L 47/2441* (2013.01);
(Continued)

(58) Field of Classification Search
None
See application file for complete search history.

(56) References Cited

U.S. PATENT DOCUMENTS 8,194,549 B2 * 6/2012 Huber .................. H04L 45/302
370/235
8,854,965 B1 * 10/2014 Richards ............ H04L 47/2433
370/235

(Continued)

FOREIGN PATENT DOCUMENTS

WO   2006020105 A1   2/2006

OTHER PUBLICATIONS

International Search Report and Written Opinion—PCT/US2017/020744—ISA/EPO—dated Jun. 21, 2017.

(Continued)

*Primary Examiner* — Eunsook Choi
(74) *Attorney, Agent, or Firm* — Qualcomm IP Dept.; James Hunt Yancey, Jr.

(57) ABSTRACT

A core network (CN) may establish and distribute a quality of service (QoS) policy across a wireless communication system, e.g., by sending QoS policy information to an access network and to user equipment. The QoS policy may be implemented with respect to data network (DN) sessions as well as data sessions. For each DN session or data session, the QoS policy may be applied by explicit or implicit request, and data sessions may in some examples utilize pre-authorized QoS policies without the need to request the QoS. Other aspects, embodiments, and features may also be claimed and described.

20 Claims, 24 Drawing Sheets

Related U.S. Application Data

(60) Provisional application No. 62/318,150, filed on Apr. 4, 2016.

(51) Int. Cl.
*H04W 28/02* (2009.01)
*H04L 12/851* (2013.01)
*H04W 72/08* (2009.01)

(52) U.S. Cl.
CPC ....... *H04L 47/805* (2013.01); *H04W 28/0268* (2013.01); *H04W 72/087* (2013.01)

(56) References Cited

U.S. PATENT DOCUMENTS

| | | | | |
|---|---|---|---|---|
| 8,934,334 | B2* | 1/2015 | Kim | H04W 24/04 370/216 |
| 10,110,342 | B2* | 10/2018 | Negalaguli | H04L 1/0026 |
| 2006/0045128 | A1* | 3/2006 | Madour | H04L 47/10 370/466 |
| 2007/0147244 | A1* | 6/2007 | Rasanen | H04W 28/16 370/231 |
| 2009/0040983 | A1* | 2/2009 | Kim | H04W 28/24 370/331 |
| 2009/0190471 | A1 | 7/2009 | Mahendran et al. | |
| 2014/0341017 | A1 | 11/2014 | Mutikainen et al. | |
| 2016/0021605 | A1* | 1/2016 | Kim | H04W 48/18 370/328 |
| 2017/0041752 | A1* | 2/2017 | Baek | H04W 76/14 |
| 2017/0041968 | A1* | 2/2017 | Jin | H04W 76/10 |
| 2017/0265063 | A1* | 9/2017 | Xie | H04L 29/08 |
| 2017/0289046 | A1 | 10/2017 | Faccin et al. | |

OTHER PUBLICATIONS

NTT DOCOMO: "Flexibility of QoS parameter setting in eNB," 3GPP TSG-RAN3 #53, R3-061070, Aug. 23, 2006, XP050159998, 5 pages.

Orange: "Solution to Key Issue on QoS Framework", 3GPP Draft; S2-160939_NEXGEN_SOL_QOS, 3rd Generation Partnership Project (3GPP), Mobile Competence Centre; 650, Route Des Lucioles; F-06921 Sophia-Antipolis Cedex; France, vol. SA WG2, No. Sophia Antipolis, FR; Feb. 23, 2016-Feb. 26, 2016; Feb. 22, 2016 (Feb. 22, 2016), pp. 1-6, XP051077932, Retrieved from the Internet: URL:http://www.3gpp.org/ftp/Meetings_3GPP_SYNC/SA2/Docs/ [retrieved on Feb. 22, 2016].

European Search Report—EP19180659—Search Authority—The Hague—dated Sep. 11, 2019.

Panasonic: "Dynamic Policy control for S2c over Trusted Non-3GPP IP access without PCC", 3GPP Draft; S2-075278, 3rd Generation Partnership Project (3GPP), Mobile Competence Centre; 650, Route Des Lucioles; F-06921 Sophia-Antipolis Cedex; France, vol. SA WG2, No. Sophia Antipolis, France, vol. SA WG2, No. Ljubljana; Nov. 18, 2007, Nov. 18, 2007, XP050261986, [retrieved on Nov. 18, 2007], 5 pages.

\* cited by examiner

Reference Architecture

QoS Model

Data Session Establishment at the
time of DN Session Establishment

Data Session Establishment Subsequent to
DN Session Establishment

AF-Triggered Data Session Establishment

Data Session Establishment based on CN Detection of Unclassified UL Flow

UE-Triggered Data Session Establishment
(Explicit QoS Request – CP-Based Solution)

UE-Triggered Data Session Establishment
(Explicit QoS Request – UP-Based Solution)

DN Session Establishment; QoS Policy applies to DN Session; No Data Session Established Pre-Authorized QoS Policy Establishment at DN Session Establishment Pre-Authorized QoS Policy Establishment at DN Session Establishment AN Rejection of QoS Policy AN Rejection of QoS Policy AN Rejection of QoS Policy

QUALITY OF SERVICE (QOS) MANAGEMENT IN WIRELESS NETWORKS

CLAIM OF PRIORITY UNDER 35 U.S.C. § 119(e)

The present Application for Patent is a divisional application of, and claims priority to U.S. Utility patent application Ser. No. 15/275,170 entitled "QUALITY OF SERVICE (QOS) MANAGEMENT IN WIRELESS NETWORKS," filed Sep. 23, 2016, which claims priority to U.S. Provisional Application No. 62/318,150 entitled "A MECHANISM FOR QUALITY OF SERVICE (QOS) MANAGEMENT IN WIRELESS NETWORKS," filed Apr. 4, 2016, both of which are assigned to the assignee hereof and hereby expressly incorporated by reference herein as if fully set forth below and for all applicable purposes.

TECHNICAL FIELD

The technology discussed below relates generally to wireless communication systems, and more particularly, to mechanisms for quality of service (QoS) management in wireless communication networks. Certain embodiments can enable and provide flexible techniques for managing QoS features aiding in network connection via fast communication, latency control, authorization control, and low network overhead.

INTRODUCTION

In a wireless communication network, a quality of service (QoS) may be provided to users of the network. A QoS mechanism generally controls parameters of the wireless network, such as its performance, its reliability, and its usability. These parameters may be determined according to certain metrics such as the coverage and accessibility of the network, and its call quality (especially audio and video quality).

Authorization of data flows and establishment of a suitable QoS mechanism can introduce a certain amount of latency within a wireless network. As the demand for mobile broadband access continues to increase, research and development continue to advance wireless communication technologies not only to meet the growing demand for mobile broadband access, but also to advance and enhance the user experience with mobile communications, including latency control aiding in reductions of latency for various aspects of the system.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for the establishment and distribution of a quality of service (QoS) policy across a wireless communication system. A QoS policy may be implemented with respect to data network (DN) sessions as well as data sessions. For each DN session or data session, a QoS policy may be applied by explicit or implicit request, and data sessions may in some examples utilize pre-authorized QoS policies without the need to request a QoS.

In one example, a method of managing quality of service (QoS) in a data network is disclosed. The method includes receiving at an access network (AN) node in an AN, from a core network (CN), QoS policy information, the QoS policy information comprising one or more QoS parameters. The method further includes determining a QoS policy based on at least a portion of the QoS policy information. The method further includes applying the QoS policy to a flow between the CN and a user equipment (UE) when a descriptor in a packet in the flow corresponds to the QoS policy.

In another example, a method of managing QoS in a data network is disclosed. The method includes receiving at a UE, from a CN, QoS policy information, receiving at the UE an indication of a resource for communicating with the CN utilizing a data session, wherein the data session utilizes a QoS policy based on the QoS policy information, and communicating with the CN utilizing the data session.

In still another example, an AN node within an AN, configured for managing QoS in a data network is disclosed. The AN node includes a processor, a memory communicatively coupled to the processor, a transceiver communicatively coupled to the processor and configured for wireless communication with a UE, and a CN interface communicatively coupled to the processor and configured for communication with a CN. The processor and the memory are configured to receive, from the CN, QoS policy information, the QoS policy information comprising one or more QoS parameters; to determine a QoS policy based on at least a portion of the QoS policy information; and to apply the QoS policy to a flow between the CN and the UE when a descriptor in a packet in the flow corresponds to the QoS policy.

In yet another example, a UE configured for wireless communication in a data network is disclosed. The UE includes a processor, a memory communicatively coupled to the processor, and a transceiver communicatively coupled to the processor and configured for communication with a CN via an AN node. The processor and the memory are configured to receive, from the CN, QoS policy information; to receive an indication of a resource for communicating with the CN utilizing a data session, wherein the data session utilizes a QoS policy based on the QoS policy information; and to communicate with the CN utilizing the data session.

In still another example, an AN node within an AN and configured for managing QoS in a data network is disclosed. The AN node includes means for receiving, from a CN, QoS policy information, the QoS policy information comprising one or more QoS parameters; means for determining a QoS policy based on at least a portion of the QoS policy information; and means for applying the QoS policy to a flow between the CN and a UE when a descriptor in a packet in the flow corresponds to the QoS policy.

In yet another example, a UE configured for wireless communication in a data network is disclosed. The UE includes means for receiving, from a CN, QoS policy information; means for receiving an indication of a resource for communicating with the CN utilizing a data session, wherein the data session utilizes a QoS policy based on the QoS policy information; and means for communicating with the CN utilizing the data session.

In still another example, a computer readable medium storing computer executable code is disclosed. The computer executable code includes instructions for causing an AN node within an AN to receive, from a CN, QoS policy information, the QoS policy information comprising one or more QoS parameters; to determine a QoS policy based on at least a portion of the QoS policy information; and to apply the QoS policy to a flow between the CN and a UE when a descriptor in a packet in the flow corresponds to the QoS policy.

In yet another example, a computer readable medium storing computer executable code is disclosed. The computer executable code includes instructions for causing a UE configured for wireless communication in a data network to receive, from a CN, QoS policy information; to receive an indication of a resource for communicating with the CN utilizing a data session, wherein the data session utilizes a QoS policy based on the QoS policy information; and to communicate with the CN utilizing the data session.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
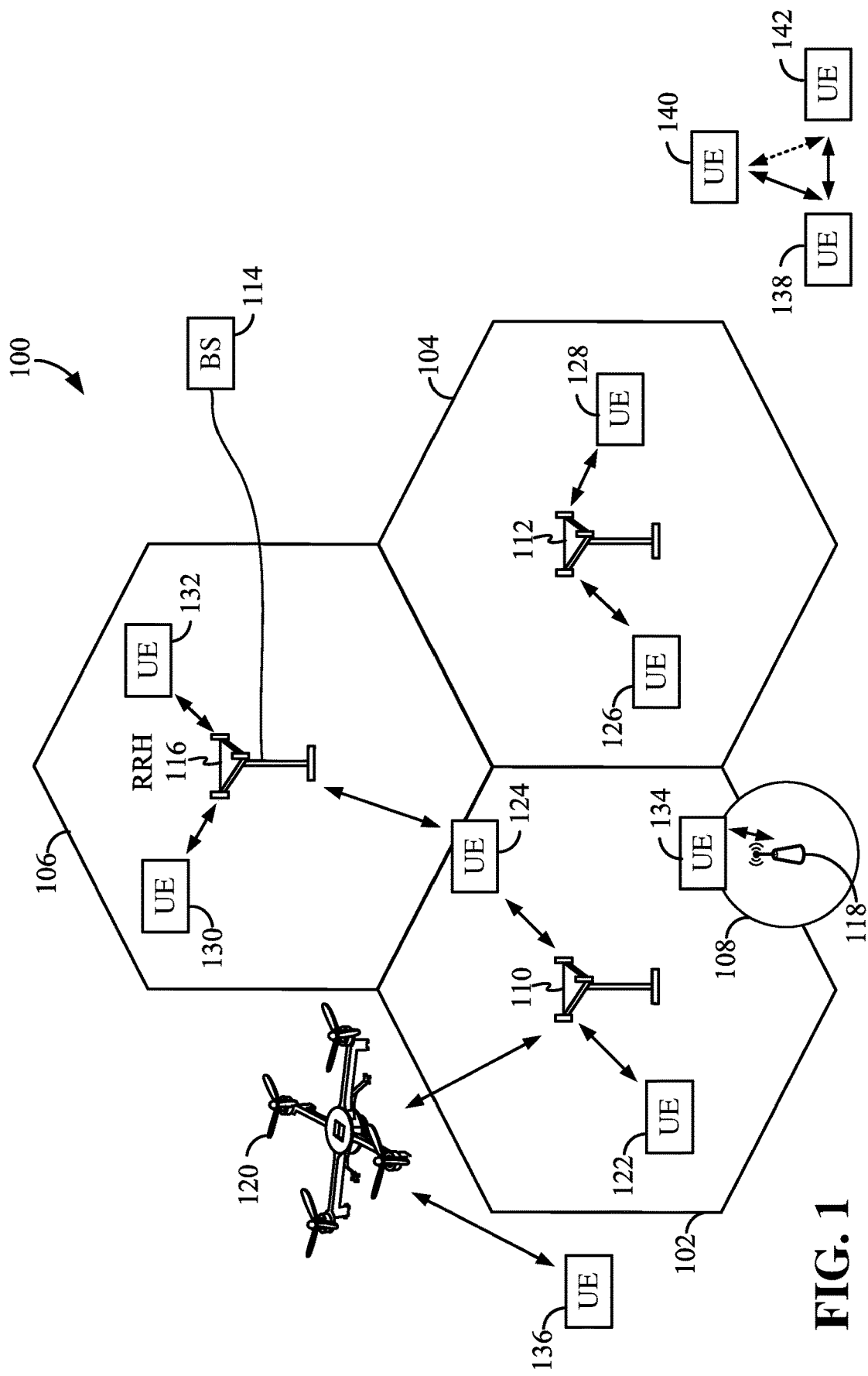
FIG. 1 is a conceptual diagram illustrating an example of an access network.

The various concepts presented throughout this disclosure may be implemented across a broad variety of communication systems, network architectures, and communication standards. Specific embodiments may be implemented in any suitable access network, whether wired or wireless. Referring now to FIG. 1, as an illustrative example without limitation, a schematic illustration of a wireless radio access network 100 is provided.

The geographic region covered by the access network 100 may be divided into a number of cellular regions (cells). This can include, for example, macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Within the access network 100, during a call with a scheduling entity, or at any other time, a UE may monitor various parameters of a signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Reference Architecture

Figure 2:
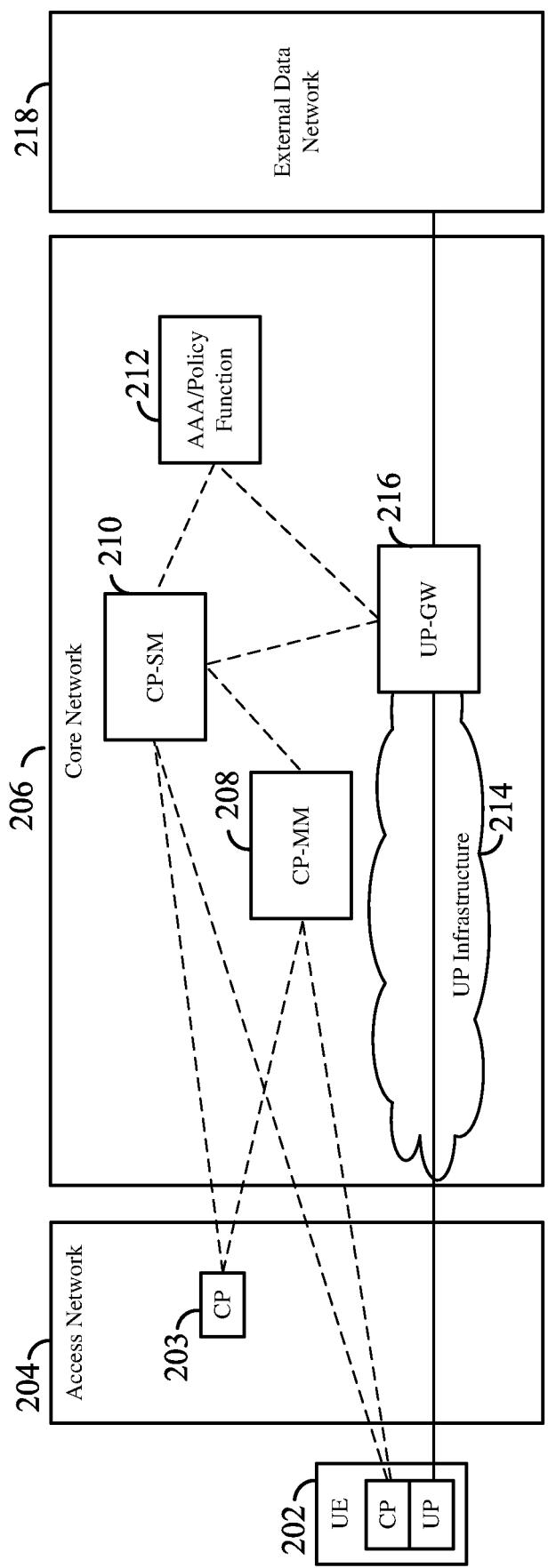
FIG. 2 is a block diagram illustrating certain aspects of an architecture for a next generation (e.g., fifth generation or 5G) wireless communication network.

FIG. 2 is a block diagram illustrating certain aspects of an architecture for a core network (CN) in a next generation (e.g., fifth generation or 5G) wireless communication network. Features may include a UE 202 in communication with a core network 206 by way of an access network 204. In this illustration, as well as in FIGS. 3 and 4, any signal path between a UE and a CN is presumed to be passed between these entities by an access network, as represented by an illustrated signal path crossing the access network. Here, the access network 204 may be the access network 100 described above and illustrated in FIG. 1. In another example, the access network 204 may correspond to an LTE (eUTRAN) network, a wired access network, a combination of the above, or any other suitable access network or networks. In the description that follows, when reference is made to the access network (AN) or actions performed by the AN, it may be understood that such reference refers to one or more network nodes in the AN that is or are communicatively coupled to the CN, e.g., via a backhaul connection. As one non-limiting example, for clarity of description, such reference to the AN may be understood as referring to a base station. However, those of ordinary skill in the art will comprehend that this is may not always be the case, for example, as in certain 3G RANs where base stations are under the control or direction of centralized radio network controllers within their AN.

Figure 3:
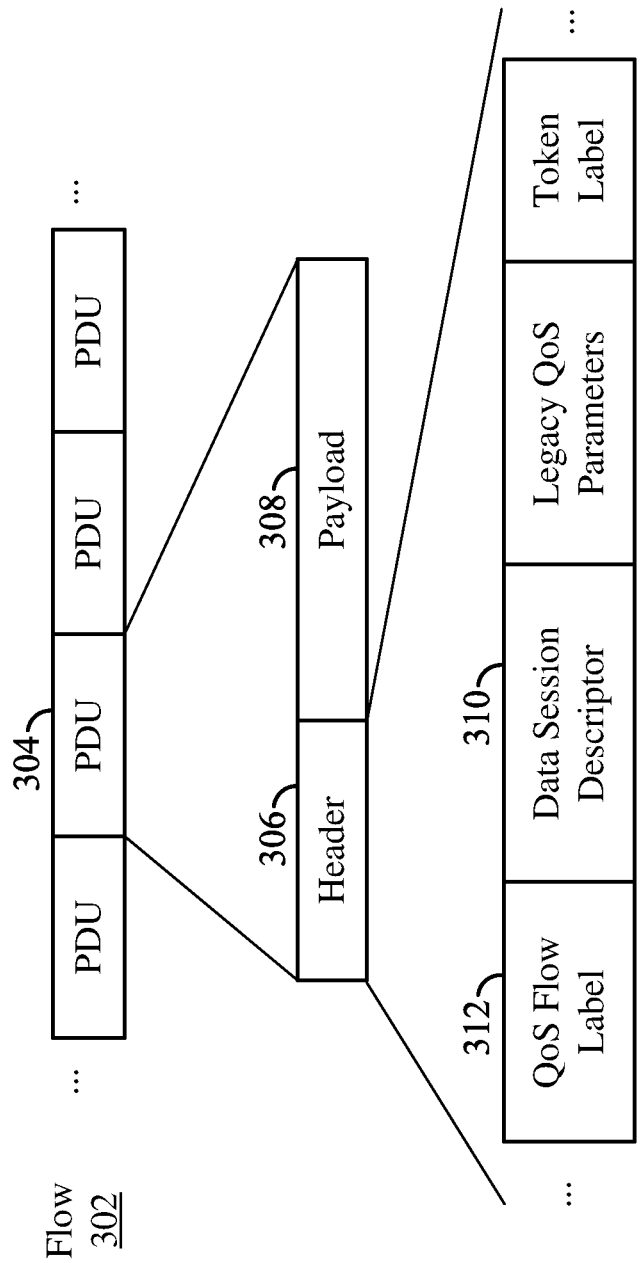
FIG. 3 is a schematic illustration of a structure of packets in a data session.
Figure 4:
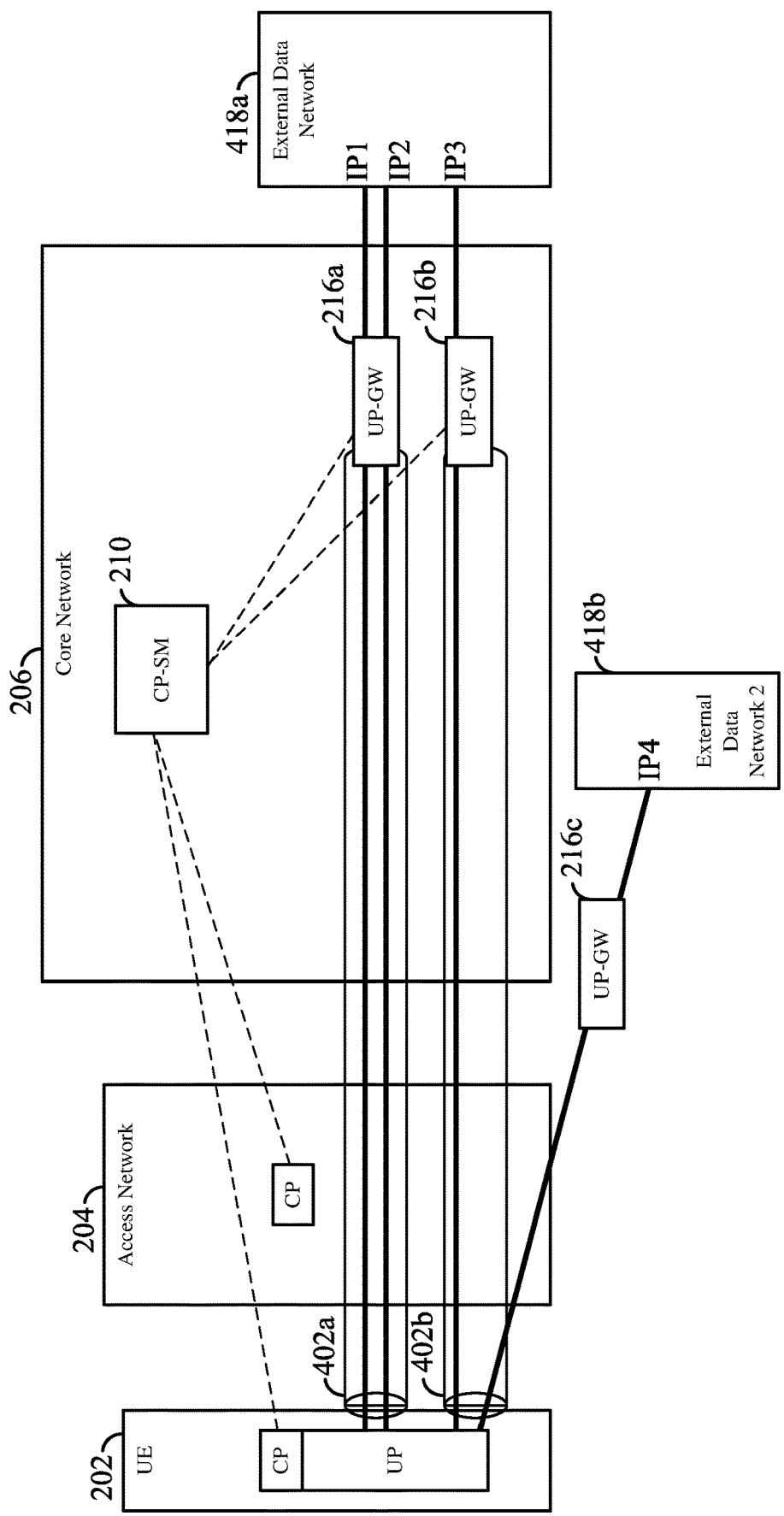
FIG. 4 is a block diagram illustrating one example of communication utilizing the architecture described above and illustrated in FIG. 2.

The UE 202 has both user plane (UP) and control plane (CP) functionality (and may have UE features discussed generally herein). In FIGS. 2-4, CP signaling is indicated by dashed lines, and UP signaling is indicated by solid lines. The access network (AN) 204 also includes some CP functionality, illustrated with the CP block 203 at the AN 204, but the majority of the CP functionality is at the CN 206. Specifically, the CN 206 includes a control plane mobility management function (CP-MM) 208 and a control plane session management function (CP-SM) 210.

The CP-MM 208 establishes and maintains the mobility management context for a device (e.g., the UE 202) that attaches to the CN 206 over one or more access technologies. The CP-SM 210 establishes, maintains, and terminates data network (DN) sessions and data sessions in the next generation system architecture, including establishing these sessions on demand. The CP-SM 210 further decides the quality of service (QoS) (that is, it performs QoS shaping, discussed below) for a UE, for a DN session and/or a data session.

An authentication, authorization, and accounting (AAA) server/policy function (PF) block 212 acts as a profile repository and authentication server. The AAA/policy function block 212 may store a subscriber profile and subscriber credentials, and may store and make decisions about policies (e.g. a QoS policy) to be applied for a UE for a DN session and/or a data session.

A user plane (UP) infrastructure entity 214 represents any suitable communication infrastructure in the CN 206 that delivers data between the AN 204, a user plane gateway (UP-GW) 216, and an external data network 218. The UP-GW 216 may be communicatively coupled with the CP-SM 210 to configure the UP connection over the CN 206. The external data network may be any suitable data network, including but not limited to the Internet, an IP multimedia subsystem (IMS) network, etc.

In the present disclosure, when reference is made to a core network or CN, it may be presumed that such reference is intended to mean any of the nodes within the CN, unless specific reference to a particular node is made.

Data Sessions and DN Sessions

When the UE 202 establishes connectivity with the CN 206, there are generally two different types of sessions that may be established: a data network session, and a data session. In some examples, a data session may equivalently be referred to as a packet data unit (PDU) session.

A data network (DN) session is a logical context, or a set of context information in various entities that provides a framework for connectivity between a local endpoint in the UE 202 (e.g., a web browser) and a remote endpoint in the external data network 218 (e.g., an IMS network, the Internet, dedicated networks, a Web server in a remote host, etc.). The DN session contains state information relating to various entities, such as the UE, the AN, the CN, gateways, etc., and may be served by multiple UP-GWs in one or more CNs. A DN session may contain one or more data sessions.

A data session (also referred to as a protocol data unit (PDU) session, a data flow, or a flow) is a logical context in a UE that enables communication between a local endpoint in the UE (e.g. a web browser) and a remote endpoint in the external data network 218 (e.g. a web server in a remote host). FIG. 3 is a schematic illustration of a flow 302 (e.g., a data session) including a series of PDUs. A data session may be an Internet protocol (IP) session or a non-IP session (e.g., Ethernet traffic). Within the present disclosure, any references to packets or PDUs (protocol data units) are interchangeable and are meant to refer to either an IP packet or a non-IP PDU.

The data session may be considered a flow of data packets, each data packet having a common descriptor and a specific header mapping, e.g., an IP header, transport protocol header, etc. In FIG. 3, a single PDU 304 is expanded to illustrate that the PDUs include a header 306 and a payload 308. The header 306 is further expanded to illustrate, conceptually, some of the information that may appear in such a packet header according to some aspects of the present disclosure. Of course, those of ordinary skill in the art will comprehend that the order or sequence of information, or its inclusion, may vary from one implementation to another.

When an entity in the CN needs to associate certain information (e.g., QoS information) with a specific data session, it may identify the data session with a data session descriptor 310. Here, a data session descriptor or data flow descriptor is the set of information carried in each packet (e.g., in the headers or in a label attached to the headers), which can be identified by the network without requiring deep packet inspection (DPI).

Exemplary Communication Example

FIG. 4 is a block diagram illustrating one example of communication utilizing the architecture described above and illustrated in FIG. 2. In this example, a UE 202 may have multiple DN sessions with the CN 206. As seen in FIG. 4, the exemplary UE 202 has two DN sessions 402*a* and 402*b* with the CN 206. As described above, each DN session may be matched to multiple IP addresses. As seen here, the UE 202 has two data sessions or PDU sessions within each illustrated DN session, and each of the data sessions may have a different IP address.

In an aspect of the disclosure, each DN session 402*a*, 402*b* may be resolved to any suitable number of one or more UP-GWs in one or more CNs. In the illustrated example, within the first DN session 402*a*, two data sessions (having IP addresses labeled IP1 and IP2) are served by the same UP-GW: namely, a first UP-GW 216*a*. However, within the second DN session 402*b*, two data sessions (having IP addresses labeled IP3 and IP4) are served by different UP-GWs: namely, a second UP-GW 216*b* and a third UP-GW 216*c*.

A session management context (e.g., leveraging software defined networking (SDN) and signaling routing) for the first DN session 402*a* and the second DN session 402*b* may be provided in the CP-SM 210. The user plane context (e.g., QoS, tunneling, etc.) for the first DN Session 402*a* may be provided in the first UP-GW 216*a*, while the user plane context for the second DN Session 402*b* may be provided in both the second UP-GW 216*b* and the third UP-GW 216*c*.

In a conventional CN, an application communicates with a packet data network (PDN) such as the Internet or an IP multimedia subsystem (IMS) network by making reference to an access point name (APN). The APN may function as a DNS name, which translates to the IP address of a packet data network (PDN) gateway (P-GW). Accordingly, an application is bound to the APN, which determines the P-GW through which a PDN connection is made. In an aspect of the disclosure, however, applications may be bound not to an access point name (APN), but may instead be bound to a specific data session. That is, for each connection, there may be a data path or data session established in the CN 206. For example, a data session may be an Internet protocol (IP) tunnel, software-defined network (SDN)-configured routing, etc.

QoS Model—Overview

Figure 5:
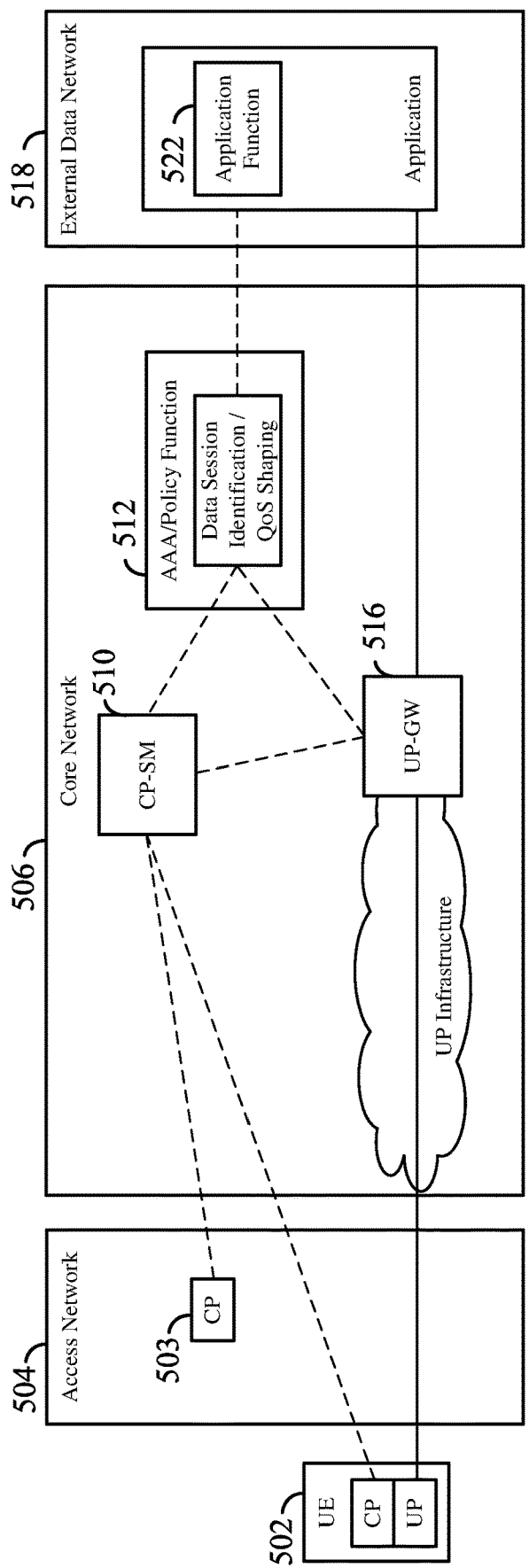
FIG. 5 is a block diagram illustrating certain aspects of a quality of service (QoS) model as it may be implemented in a next-generation (e.g., 5G) network utilizing the architecture described above and illustrated in FIGS. 2 and 3.

FIG. 5 is a block diagram illustrating certain aspects of a quality of service (QoS) model as it may be implemented by a next-generation (e.g., 5G) core network utilizing the architecture described above and illustrated in FIGS. 2 and 4. In this illustration, only some of the nodes in the CN are illustrated for clarity. It may be assumed that the UE 502, the AN 504, the CN 506, and the external data network 518 are as described above in relation to FIGS. 2 and 4.

In a wireless communication network, a quality of service (QoS) may be provided to users of the network. The QoS mechanism generally controls parameters of the wireless network, such as its performance, its reliability, and its usability. These parameters may be determined according to certain metrics such as coverage and accessibility of the network, and its call quality (especially audio and video quality). Specifically, a QoS policy that may be implemented according to certain aspects of the disclosure may contain QoS parameters including but not limited to a maximum bit rate for a UE, a maximum uplink bit rate for a specific DN session, a maximum downlink bit rate for a DN session, a guaranteed bit rate (GBR) for a data/PDU session, packet filtering information, bearer priority, etc. Accordingly, an AN node may apply a QoS policy to a flow, a data session, or a DN session by controlling parameters of a flow such as an uplink or downlink bit rate, a GBR, packet filtering (e.g., determining to allow or block packets based on their content), prioritizing a flow, etc.

As used herein, the term legacy access network, legacy core network, or legacy radio access technology (RAT) may refer to a network or RAT employing a second generation (2G), third generation (3G), or fourth generation (4G) wireless communication technology. For example, a 2G RAT may be one based on a set of standards that complies with Interim Standard 95 (IS-95) or cdmaOne, Global System for Mobile (GSM), General Packet Radio Service (GPRS), or Enhanced Data Rates for GSM Evolution (EDGE). A 3G RAT may be one based on a set of standards that complies with the International Mobile Telecommunications-2000 (IMT-2000) specifications, including but not limited to certain standards promulgated by the 3$^{rd}$ Generation Partnership Project (3GPP) and the 3$^{rd}$ Generation Partnership Project 2 (3GPP2). A 4G RAT may be one based on a set of standards that comply with the International Mobile Telecommunications Advanced (ITU-Advanced) specifications, including but not limited to certain standards promulgated by 3GPP.

Some examples of 3G standards defined by 3GPP include Universal Mobile Telecommunication System (UMTS), Universal Terrestrial Radio Access (UTRA), High Speed Packet Access (HSPA), and HSPA+. Some examples of 3G standards defined by 3GPP2 include CDMA2000 and Evolution-Data Optimized (EV-DO). Some examples of 4G standards defined by 3GPP include Evolved Universal Terrestrial Radio Access (eUTRA), Long-Term Evolution (LTE), LTE-Advanced, and the Evolved Packet System (EPS). Other examples of standards employing 3G/4G wireless communication technology include the IEEE 802.16 (WiMAX) standard and other suitable standards.

As further used herein, the term next generation access network, next generation core network, or next generation RAT generally refers to a network or RAT employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum (www.vztgf) and Korea Telecom SIG (www.kt5g.org).

In legacy, previous, or existing (e.g., 3G and 4G) networks, the QoS is supported by specific tunnels. In particular, with reference to a 4G evolved packet system (EPS), one or more EPS bearers may be established for a PDN connection, where an EPS bearer is considered a tunnel between the UE and a P-GW. There may be one such tunnel for each level of QoS, for each UE. That is, QoS may be enforced based on this tunnel, which is identified by a bearer ID. From the UE perspective, one tunnel between two CN user plane entities (e.g., a UP-GW and an AN) is established for each level of QoS for each IP address. That is, packets transported in the network may be treated, from a QoS point of view, in a particular tunnel, whereas packets that require different treatment may be put in different, separate tunnels. On the other hand, in a next-generation (e.g., 5G) network, the CN may utilize a bearerless QoS model. In such a bearerless QoS model, separate tunnels may not necessarily exist specifically for the purpose of QoS differentiation. A next-generation (e.g., 5G) network may in some examples utilize one tunnel for each data flow, for each UE. In other examples, the 5G network may use one tunnel for each DN session for each UE. Here, the tunnel may be independent of the QoS of the data flows corresponding to the DN session. In still other examples, the 5G network may use one tunnel for each DN session, for each UE, for each anchor point (i.e., a PDN GW or UP-GW, depending on the nature of the network). That is, unlike in a legacy network, here, a single DN session may be anchored in multiple gateways. Note that a CN 506 may use tunnels for routing the packets and for session/IP continuity purposes. However, in an aspect of the present disclosure, the QoS may be orthogonal to and independent of whatever routing mechanism the CN 506 adopts.

According to an aspect of the disclosure, the CN 506 (e.g., the CP-SM 510, the AAA/PF block 512, or another suitable CN node having similar functionality) may be the entity that makes decisions about the QoS. This can include the CN 506 provisioning, configuring, or setting decisions on what QoS to assign to traffic data based on subscription profile, policies, service requirements, etc. This may be referred to as QoS shaping in some scenarios. Here, the derived QoS policy information may be distributed using out-of-band control-plane signaling from the CN 506 to an AN 504, a UE 502, and to one or more UP-GWs 516. This is distinguished from traffic identification and authorization, which is generally performed in-band.

Flow Labeling

By virtue of this QoS model, deep packet inspection (DPI) may be avoided for each individual packet. To determine the services or applications to which a data packet corresponds, legacy networks generally perform DPI to analyze a packet. However, here, because the CN 506 installs and distributes the QoS policy, the various entities in the network may analyze each packet without performing DPI, but rather, by matching the packets to their descriptor as described above.

The AN 504 may have no application-related awareness of the QoS model. Specifically, QoS information may be distributed to the various ANs via an access-independent mechanism. While QoS information may contain parameters specific to the various access technologies, each AN may use only the parameters relevant to that AN (i.e., the AN may identify the parameters within the QoS policy that apply to that specific AN).

The CN 506 may implement QoS by utilizing flow labeling to label each data session or flow. That is, the CN 506 may label all of the information relating to the QoS in the packets, and the CN 506 may detect a data session descriptor 310 within a packet to determine how to treat that packet from a QoS point of view. The CN 506 may apply the label to downlink (DL) packets destined for the UE 502, and the UE 502 may apply the label to uplink (UL) packets destined for the CN 506. Referring to FIG. 3, an exemplary QoS flow label 312 is illustrated as part of the packet header 306.

Generally, the AN 504 maps the flow labels (i.e., whatever label is applied to a packet) to parameters or information (such as a QoS policy) that the AN 504 receives from the CN 506. In operation, the AN 504 receives QoS information from the CN 506, and receives data packets either from the UE 502 or from the CN 506. The AN 504 then matches the packet (based on its flow label or descriptor) with the QoS information it receives from the CN 506, and based on this information, determines how to treat the packets. For example, in the case of a radio access network (RAN), this may include determining how to map the packets to the appropriate radio bearers.

Flow Authorization

In general, there may be two steps relating to QoS after establishing a data session or flow. One is to authorize the flow: that is, to verify that the UE 502 is authorized or allowed to transmit the data in that flow. Then, the QoS policy may be defined for the flow. Flow authorization may in some examples be explicitly provided by the CN 506. For example, when a data session is created, the CN 506 may make a decision on authorizing the flow and may generate the QoS policy and then distribute this policy, as described above. However, in another example, application of a QoS policy to a flow within the AN 504 may be pre-authorized by the CN 506 on a per-UE basis for some data sessions.

In general, the AN 504 may be aware of certain information regarding packets provided by the CN 506. That is, the AN 504 is flow-level aware. Accordingly, the AN 504 may match certain packets in a given flow to their descriptor, and may apply appropriate QoS policies. The AN 504 then determines how to handle those packets, such as by distributing multiple CN flows into different data radio bearers.

Application awareness in the AN 504 may be per-flow and per-subscriber in certain scenarios. Based on, e.g., UE-assisted characteristics, preferences, and/or preconfigured information in the AN 504, etc., the AN 504 may perform smart handling of user data. For example, the AN 504 may perform locally cached data delivery or per service local breakout and local-switching operations, according to user service preference, service popularity, etc. Generally, there may be no application or service detection in the AN 504, but only flow matching. That is, the AN 504 may assume eventually the binding is defined per flow before packets get into the packet data convergence protocol (PDCP), and the AN 504 may get to define what a radio bearer means and the treatment it receives.

In this manner, by providing QoS policy information to the AN 504, the handling and labeling of flows from the CN 506 to the AN 504 can be independent of the application, and can be independent of the radio access technology (RAT) utilized by the AN 504. That is, with the AN 504 mapping the packets to the appropriate radio bearer according to the QoS policy, the CN 506 need not be concerned with these details of the AN 504.

As discussed generally above, the CN 506 can deliver QoS information to other entities, including the AN 504, the UP-GW 516, and the UE 502. Thus, in a CN-to-AN interaction, the CN 506 (e.g., the CP-SM) may deliver QoS policies to the AN 504 (e.g., the control plane entity at the AN). These QoS policies may include a mapping of DL packets to an AN QoS; a mapping of an AN QoS to DL packets; traffic filtering; etc. These QoS policies may additionally describe behavior based on certain data session descriptors.

In an aspect of the present disclosure, information relating to the QoS policy provided from the CN 506 to the AN 504 may include one or more possible pre-authorized QoS policies to be used for the establishment of future data sessions. These pre-authorized QoS policies may be pre-authorized independent of any current or ongoing traffic. That is, the CN 506 may provide to the AN 504 a set of QoS policies for data sessions that the UE 502 can later establish, without requiring explicit authorization by the CN 506. For example, assume that a UE 502 establishes a DN session (e.g., DN session 302*a* in FIG. 3), although any data session(s) or PDU sessions may not necessarily be established. Here, the CN 506 may receive a packet from the UE 502 prior to the establishment of a data session. The CN 506 may decide, based for example on policies in a user's subscription profile, or based on a descriptor in the packet received from the UE 502, that certain data sessions are pre-authorized so there is no need for further authorization. Accordingly, the AN 504 may deploy a data session in the future, corresponding to the DN session according to the pre-authorization.

Yet still AN 504 may have additional session-established features. For example, the CN 506 may trigger QoS establishment in the AN 504. Depending on the AN technology and AN QoS model, this may result in the establishment of dedicated resources (e.g. dedicated bearers in a RAN) or resource priority modification (higher, lower, or other alternatives). Still further, the CN 506 may provide information for DL and UL tokens to the AN 504.

Regarding the CN-to-UP-GW interaction (e.g., between the CP-SM and the UP-GW), the CN 506 may deliver QoS shaping information to the UP-GW 516, and may configure certain resource establishment in the UP-GW 516, enabling the UP-GW to filter packets and to provide QoS. Further, the CN 506 may provide to the UP-GW 516 information for DL and UL tokens.

Regarding the CN-to-UE interaction (e.g., between the CP-SM and the UE), the CN 506 may provide to the UE 502 explicit per-UE/subscriber policies that are independent of any existing data sessions. This information from the CN 506 may additionally include information relating to the pre-authorized data sessions described above. Further, the CN 506 may provide to the UE 502 updated QoS information corresponding to a newly created data session involving the CP-SM 510. This may include all the information that the UE 502 requires when the data session begins, so that the UE 502 may determine how to handle the packets in that data session. Still further, the CN 506 may provide to the UE 502 information relating to packet marking of UL transmissions from the UE 502. For example, this may include information relating to an UL token.

Compatibility

In some implementations, one or more QoS parameters from legacy (e.g., 3G and/or 4G) networks may still be required to enable interworking with those legacy access networks, such as a handover to/from such legacy access networks. The QoS policy disclosed herein may include such legacy QoS parameters, which may be distributed by the CN 506. That is, QoS parameters within a QoS policy may include one or more QoS parameters corresponding to a different network, other than the network implementing the QoS policy. However, these legacy QoS parameters will generally be used only when the UE 502 is connected to such a legacy AN.

Data Session Establishment

As described above, the establishment of a data session may involve authorization of the flow, and QoS policy establishment for the flow. In an aspect of the disclosure, the CN 506 may perform the QoS shaping (including traffic authorization), and the CN 506 may send the QoS policy information to the UP-GW 516, the AN 504, and the UE 502.

Figure 6:
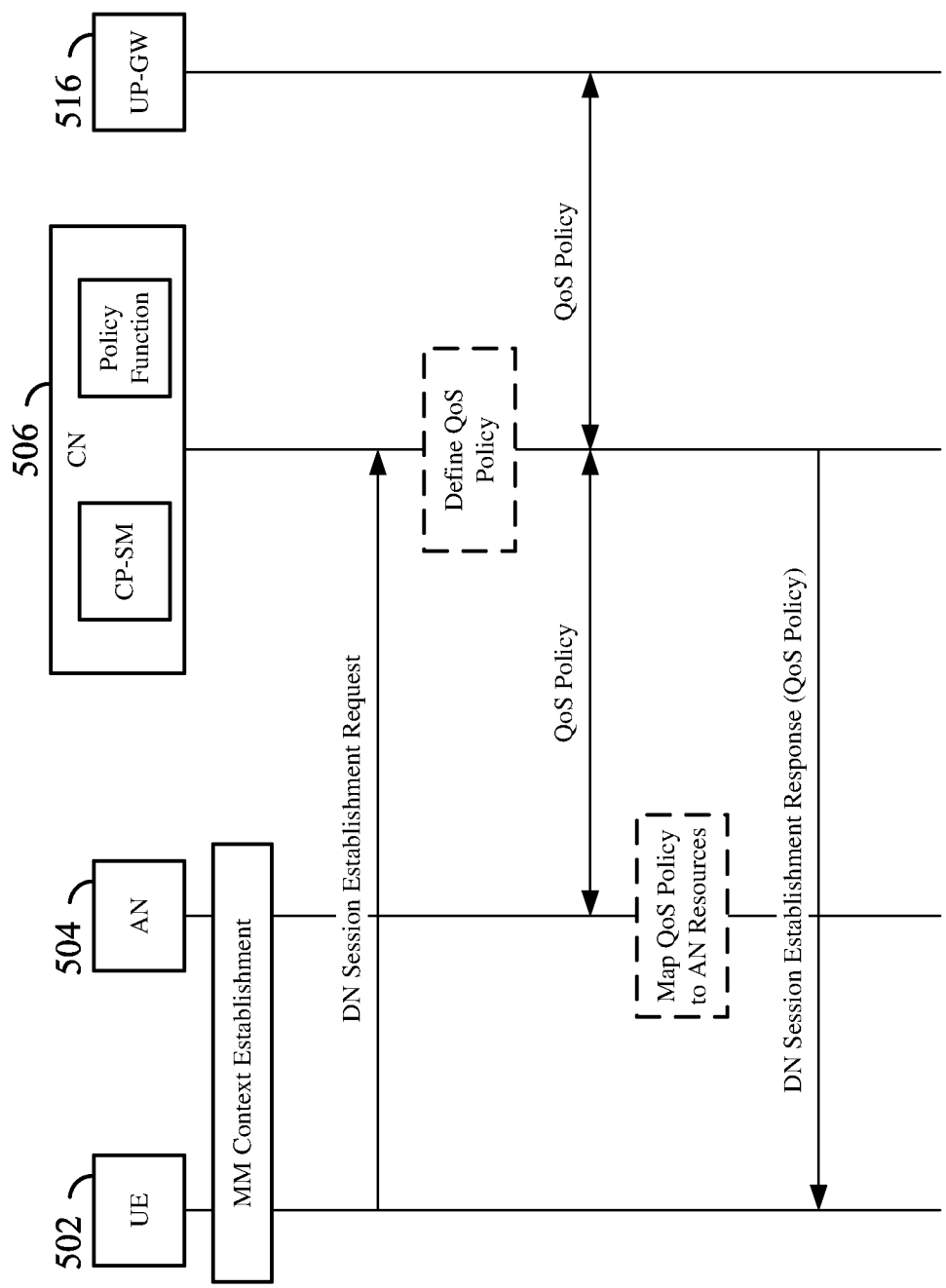
FIG. 6 is a call flow diagram illustrating an exemplary process for the establishment of a data network (DN) session, and at the same time, establishing a data session or protocol data unit (PDU) session.
Figure 7:
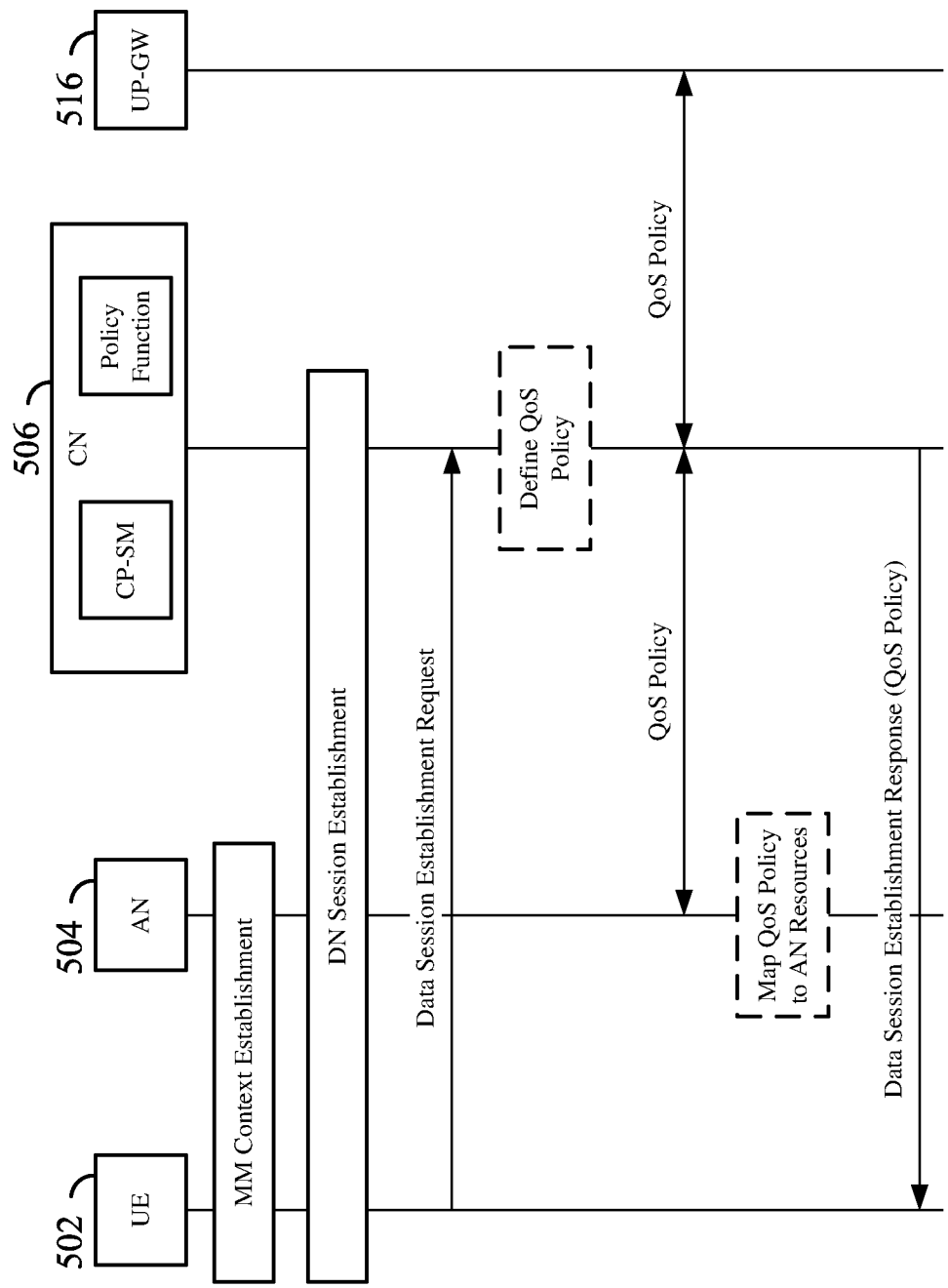
FIG. 7 is a call flow diagram illustrating an exemplary process for the establishment of a data session or PDU session subsequent to the establishment of a DN session.

FIGS. 6 and 7 are call flow diagrams that illustrate basic examples of data session establishment according to some aspects of the disclosure. In these figures, and all of the call flow diagrams that follow, communication between the illustrated nodes is illustrated by arrows between lines extending from the respective nodes, in sequence, with time moving forward in the downward direction. Other embodiments may have other sequence actions or varied implementation orders as desired.

FIG. 6 is a call flow diagram illustrating an exemplary process for the establishment of a DN session, and at the same time, establishing a data session or PDU session. In the illustrated example, a QoS policy is concurrently established in association with the DN session and data session.

After a mobility manager (MM) context is established between the UE 502 and the AN 504, the UE 502 may request establishment of a DN session by transmitting a DN session establishment request to the CN 506 (i.e., to the CP-SM 510). (In another example, the CN may be capable of triggering the establishment of a DN session.) The control plane of the CN 506 defines a QoS policy corresponding to the DN session establishment request from the UE 502, and provides the QoS policy to the AN 504 and the UP-GW 516. The AN 504 maps the QoS policy to the resources in the AN 504 as described above, e.g., by identifying a subset of QoS parameters (less than or all of the QoS parameters) within the QoS policy that apply to that AN 504, and applying the QoS policy according to that subset. The CN 506 then transmits a DN establishment response to the UE 502 corresponding to the QoS policy.

FIG. 7 is a call flow diagram illustrating an exemplary process for the establishment of a data session or PDU session subsequent to the establishment of a DN session. Here, a QoS policy is established in association with the data session.

After a MM context is established between the UE 502 and the AN 504, a DN session may be established between the UE 502 and the CN 506 (e.g., utilizing the process described above and illustrated in FIG. 6). The DN session establishment may or may not have an associated QoS policy, and may or may not include the establishment of one or more data sessions. The UE 502 may then transmit a data session or PDU session establishment request to the CN 506 (i.e., to the CP-SM 510). The control plane of the CN 506 defines a QoS policy corresponding to the data session establishment request from the UE 502, and provides the QoS policy to the AN 504 and the UP-GW 516. The AN 504 maps the QoS policy to the resources in the AN 504 as described above, e.g., by identifying a subset of QoS parameters (less than or all of the QoS parameters) within the QoS policy that apply to that AN 504, and applying the QoS policy according to that subset. The CN 506 then transmits a data establishment response to the UE 502 corresponding to the QoS policy.

This example in FIG. 7 is but one example of the possible ways that a QoS policy may be established for a new data session. According to various aspects of the present disclosure, any of a variety of options may be utilized for establishment of a data session. These options include an application function (AF)-triggered data session establishment, an implicit UE request for a data session, and an explicit UE request for a data session.

AF-triggered data session establishment is utilized in current evolved packet core (EPC) (e.g., LTE) networks. An AF 522 within an external data network 518 may, for example, be associated with an IMS server or other external application. The AF 522 is external to the CN 506, and may trigger the data session establishment by providing information to the CN 506 so that the CN 506 may then determine that a new data session or flow (UL and/or DL) has been established.

Figure 8:
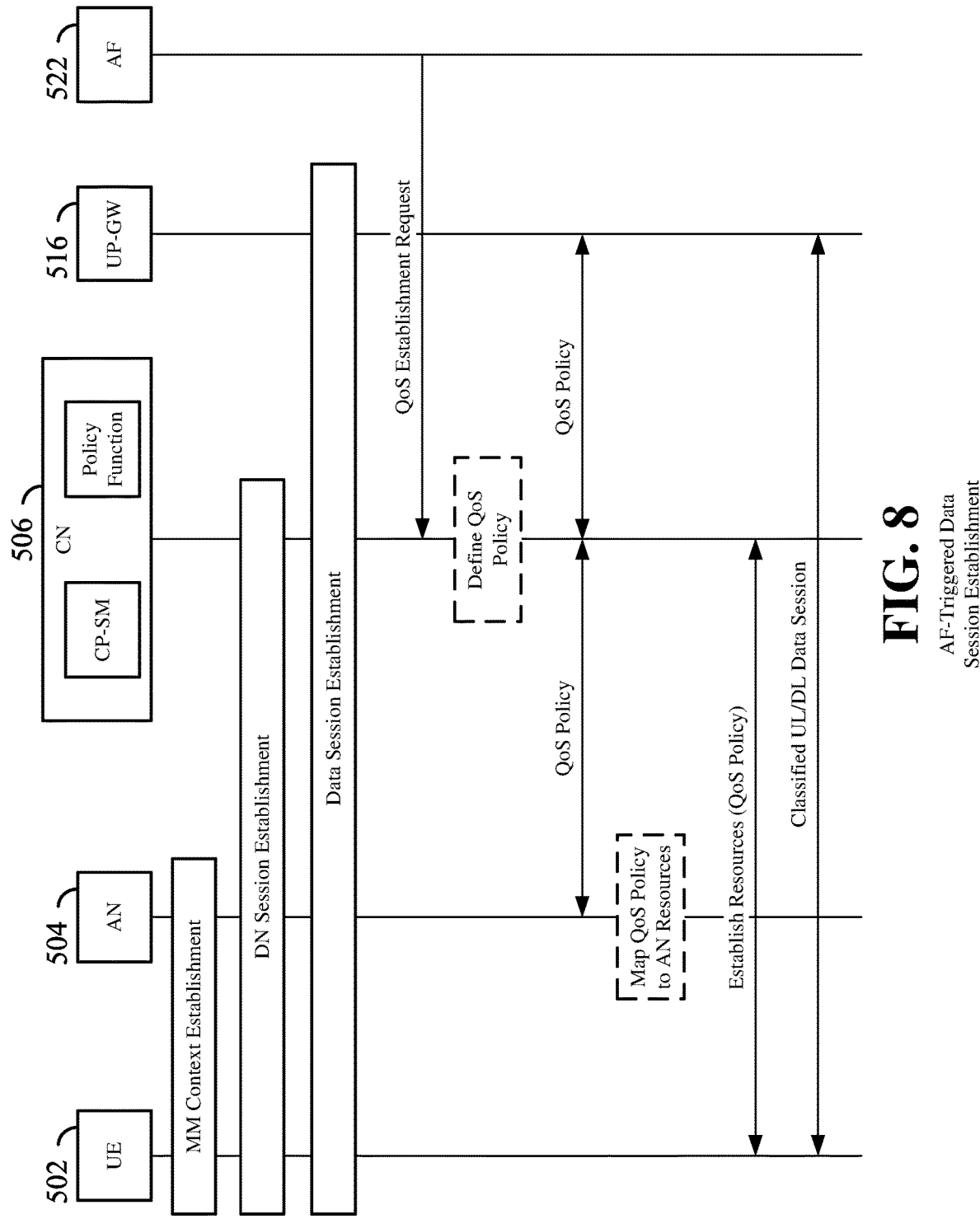
FIG. 8 is a call flow diagram illustrating an exemplary process for a core network (CN) to establish a quality of service (QoS) policy responsive to, or triggered by, a request from an external application server (AS) or application function (AF).

FIG. 8 is a call flow diagram illustrating an exemplary process for a CN 506 to establish a QoS policy responsive to, or triggered by, a request from an external application server or application function (AF) 522.

As with the above examples, an MM context is established between the UE 502 and the AN 504, a DN session is established between the UE 502 and the CN 506, and an associated data session is established between the UE 502 and the UP-GW 516. In this example, an external AF 522 that requires QoS may transmit a QoS establishment request to the control plane of the CN 506. The control plane of the CN 506 defines a QoS policy corresponding to the QoS establishment request and provides the QoS policy to the AN 504 and the UP-GW 516. The AN 504 maps the QoS policy to the resources in the AN 504 as described above, e.g., by identifying a subset of QoS parameters (less than or all of the QoS parameters) within the QoS policy that apply to that AN 504, and applying the QoS policy according to that subset.

Suitable resources are then established at the UE 502 and the CN 506 based on the AN resources and the QoS policy. At this point, the QoS-classified data session may commence at the user plane in the UL and DL directions between the UE 502 and the UP-GW 516.

In another example, the UE 502 may function to initiate a data session. According to an aspect of the present disclosure, two different options may be utilized for the UE 502 to initiate a data session and request a suitable QoS for that data session: with an explicit QoS request, or implicitly, where the CN 506 detects an UL flow sent by the UE 502.

With respect to an implicit QoS request from the UE 502, a UE-triggered data session establishment may occur when the UE 502 connects to an application or service that does not have an application function (AF) 522 that interfaces with the CN 506. Here, an application at the UE 502 may request connectivity, and accordingly the UE 502 may transmit UL packets utilizing an unclassified flow, in terms of QoS, utilizing best-effort delivery. As known to those of ordinary skill in the art, best-effort delivery may refer to delivery where a network does not guarantee delivery of the data, does not guarantee any particular QoS, and does not guarantee any priority to a flow. When this data is incoming from the UE 502 in the UL direction, the CN 506 may detect that the UE 502 has initiated transmission of an unclassified flow (e.g., its packets lack a data session descriptor 310), and the CN 506 may perform classification of this data, e.g., based on deep packet inspection (DPI). If the data is authorized, the CN 506 may then define a QoS policy that may then be delivered to the UE 502, the AN 504, and the UP-GW 516.

Figure 9:
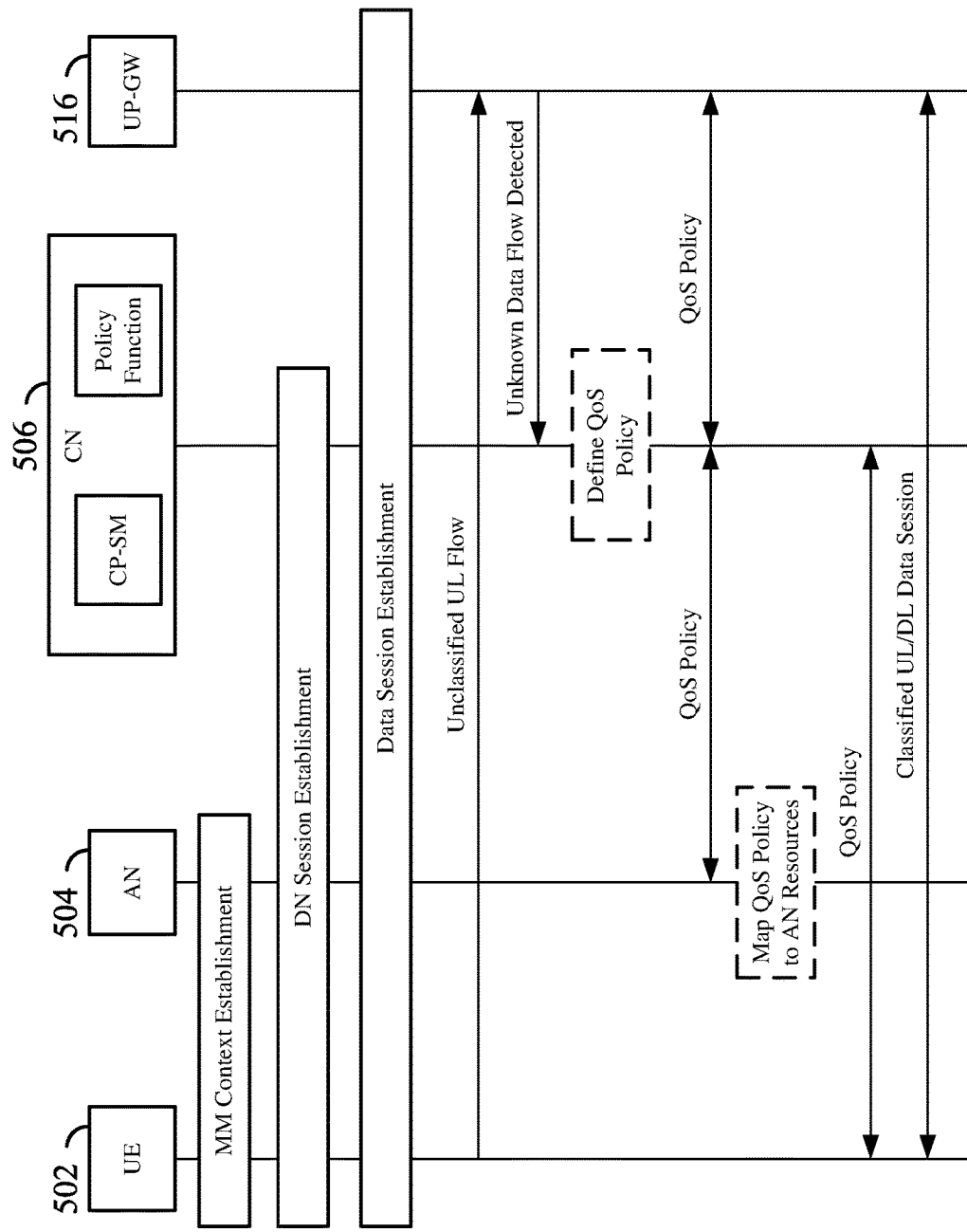
FIG. 9 is a call flow diagram illustrating an exemplary process for the establishment of a QoS policy responsive to, or triggered by, the detection of an unclassified data flow from a user equipment (UE).

FIG. 9 is a call flow diagram illustrating an exemplary process for the establishment of a QoS policy responsive to, or triggered by, the detection of an unclassified UL flow from the UE 502. This process corresponds to the implicit QoS request described above.

As with the above examples, an MM context is established between the UE 502 and the AN 504, a DN session is established between the UE 502 and the CN 506, and an associated data session is established between the UE 502 and the UP-GW 516. In this example, the UE 502 may transmit an unclassified (e.g., not explicitly indicated as belonging to a particular application or service) data flow on the uplink corresponding to the QoS policy received by the UE at DN session establishment. A typical example of such an unclassified data flow transmission may correspond to a request for a TCP session for a Web browser or other application. In the illustrated example, the UP-GW 516 detects that the UE 502 has transmitted a new flow that has not been classified and transmits an unknown data flow detected indication to the control plane of the CN 506. As another example (not illustrated), the AN 504 may detect that the UE 502 has transmitted a new unclassified UL flow and may transmit an unknown data flow detected indication to the control plane of the CN 506. The control plane of the CN 506 defines a QoS policy corresponding to one or more characteristics of the unclassified flow and provides the QoS policy to the AN 504 and the UP-GW 516. The control plane of the CN 506 then provides the QoS policy to the AN 504. The AN 504 maps the QoS policy to the resources in the AN 504 as described above, e.g., by identifying a subset of QoS parameters (less than or all of the QoS parameters) within the QoS policy that apply to that AN 504, and applying the QoS policy according to that subset. Suitable resources are then established at the UE 502 and the CN 506 based on the AN resources and the QoS policy. At this point, the QoS classified data session may commence at the user plane in the UL and DL directions between the UE 502 and the UP-GW 516. Here, the UE 502 may utilize packet marking and QoS as indicated by the QoS policy for UL transmissions of the formerly unclassified data flow. For example, this may include information relating to an UL token, described below.

Figure 21:
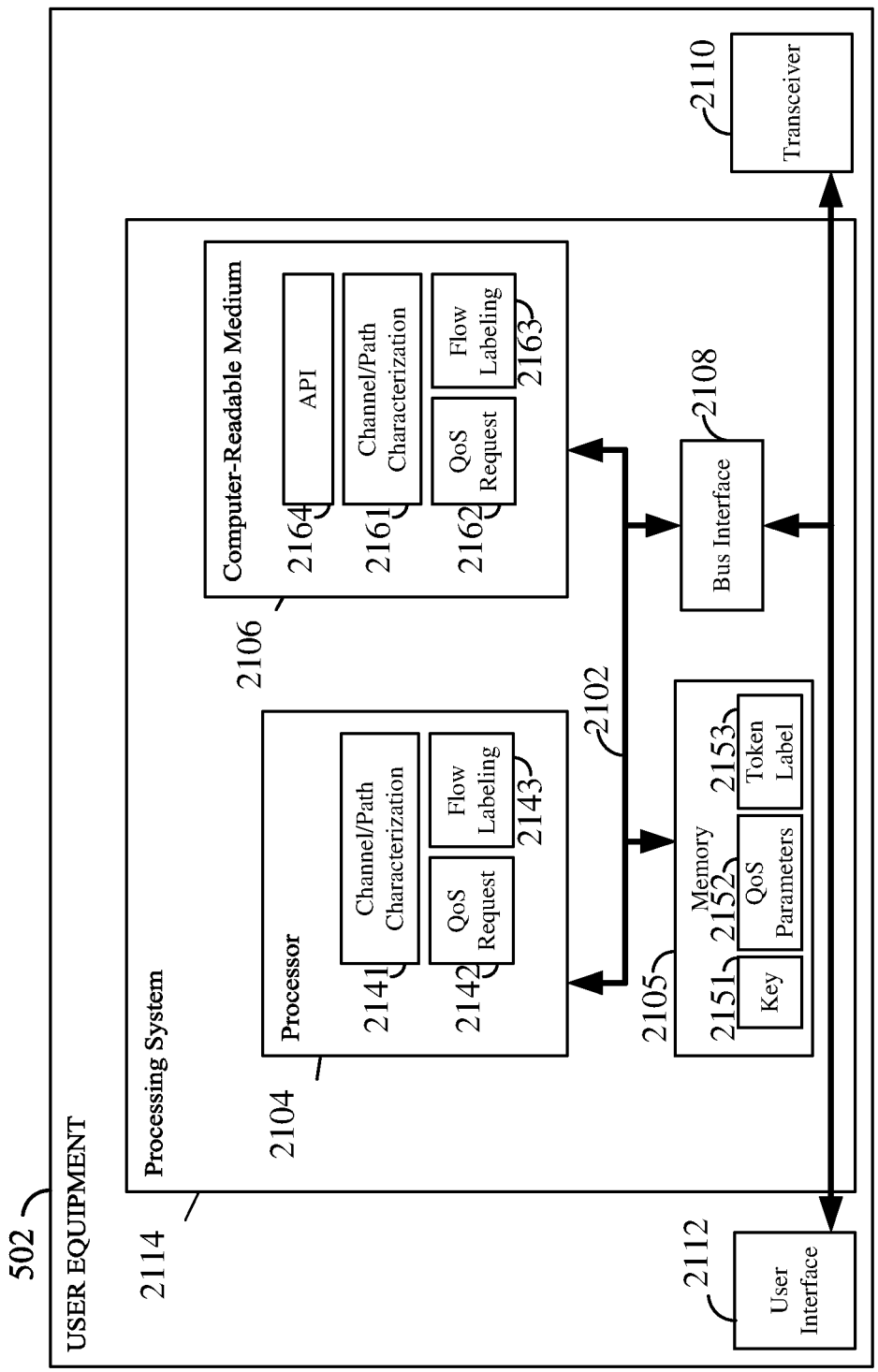
FIG. 21 is a block diagram illustrating an example of a hardware implementation for a UE employing a processing system.

With respect to an explicit QoS request, the request from the UE 502 may include a set of one or more QoS parameters for the CN 506 to apply to a data session, including but not limited to a requested guaranteed bit rate (GBR), a specific bit rate, etc. (For example, FIG. 21 illustrates a UE 502 with a set of QoS parameters 2152 stored in memory 2105). Here, two different options may exist: a control plane (C-plane)-based solution and a user plane (U-plane)-based solution. In the C-plane solution, an application agent, which may be initiated when an application is launched at the UE 502, may trigger the UE 502 to transmit a QoS request to request a new QoS or to modify the QoS. That is, the UE 502 may utilize an application program interface (API) 2164 to request the QoS. Here, the application may explicitly request the QoS via the API 2164. Here, the UE 502 may police the QoS request for that application based on policies previously provided to the UE 502 by an operator network. In another example, the application may not be capable of generating an explicit QoS request, or may require special data treatment with respect to the QoS. For example, certain QoS policies at the UE 502 may be configured by the operator network to be mapped to a specific QoS, and this may be unknown to the application. Accordingly, the UE 502 may be configured with QoS policies provided to the UE 502 by the operator network, so that the UE 502 may determine the explicit QoS requirements of an application. In this way, the UE 502 may accordingly map an application connectivity request from the application to a QoS request that it transmits to the CN 506. In this case, when the application generates traffic or requests connectivity, the UE 502 may request a suitable QoS from the CN 506.

In the U-plane solution, when the UE 502 transmits data (e.g., utilizing a best-effort flow), the UE 502 may provide an in-band indication or QoS request. Here, the indication may be a label in an IP header (in the case of IP data) indicating this is a new flow/session. The indication may also optionally provide requirements for the QoS and identifiers of the corresponding application/service. In this way, when the data reaches the UP-GW 516, the UP-GW 516 may trigger C-plane functionality to detect the indication, may perform application/service detection, and may verify/authorize the flow in collaboration with the QoS policy function, the CP-SM 510, and an application function (AF) 522 corresponding to the server to which the data traffic relates.

Figure 10:
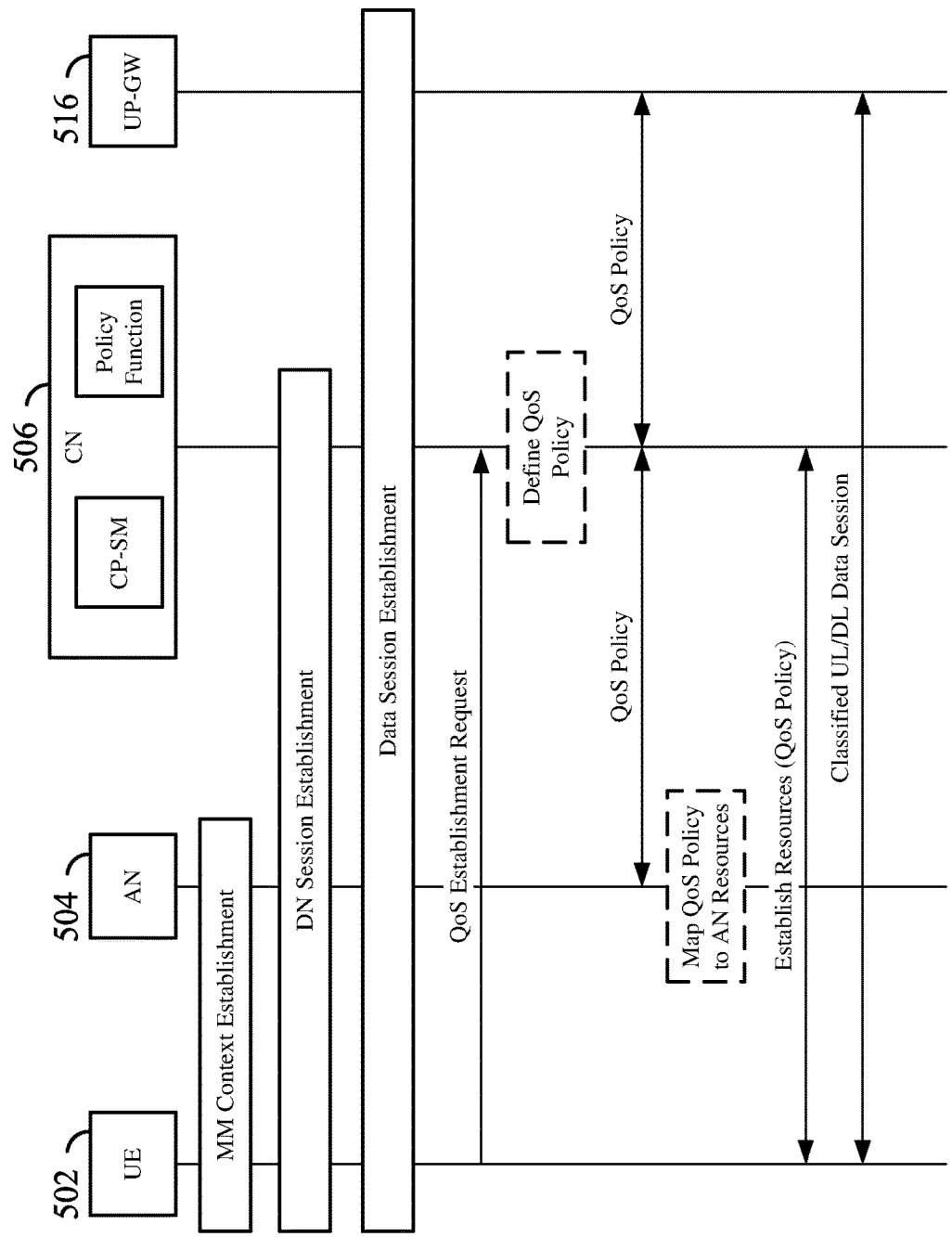
FIG. 10 is a call flow diagram illustrating an exemplary process for the establishment of a QoS policy responsive to, or triggered by, an explicit UE request for the QoS policy.

FIG. 10 is a call flow diagram illustrating an exemplary process for the establishment of a QoS policy responsive to, or triggered by, an explicit UE request for the QoS policy. This process corresponds to the control-plane-based solution for handling an explicit QoS request from the UE 502, described above. The reader may recognize that this process is similar to the exemplary process described above and illustrated in FIG. 7 for data session establishment subsequent to DN session establishment, with the addition of the explicit QoS request from the UE 502.

As with the above examples, an MM context is established between the UE 502 and the AN 504, a DN session is established between the UE 502 and the CN 506, and an associated data session is established between the UE 502 and the UP-GW 516. In this example, the UE 502 transmits an explicit QoS request utilizing out-of-band CP signaling. The explicit QoS request may include the QoS requirements, an application ID, etc., as described above. The control plane of the CN 506 defines a QoS policy corresponding to the QoS establishment request and provides the QoS policy to the AN 504 and the UP-GW 516. The AN 504 maps the QoS policy to the resources in the AN 504 as described above, e.g., by identifying a subset of QoS parameters (less than or all of the QoS parameters) within the QoS policy that apply to that AN 504, and applying the QoS policy according to that subset. Suitable resources are then established at the UE 502 and the CN 506 based on the AN resources and the QoS policy. At this point, the QoS classified data session may commence at the user plane in the UL and DL directions between the UE 502 and the UP-GW 516. Here, the UE 502 may utilize packet marking and QoS as indicated by the QoS policy for UL transmissions of the formerly unclassified data flow. For example, this may include information relating to an UL token, described below.

Figure 11:
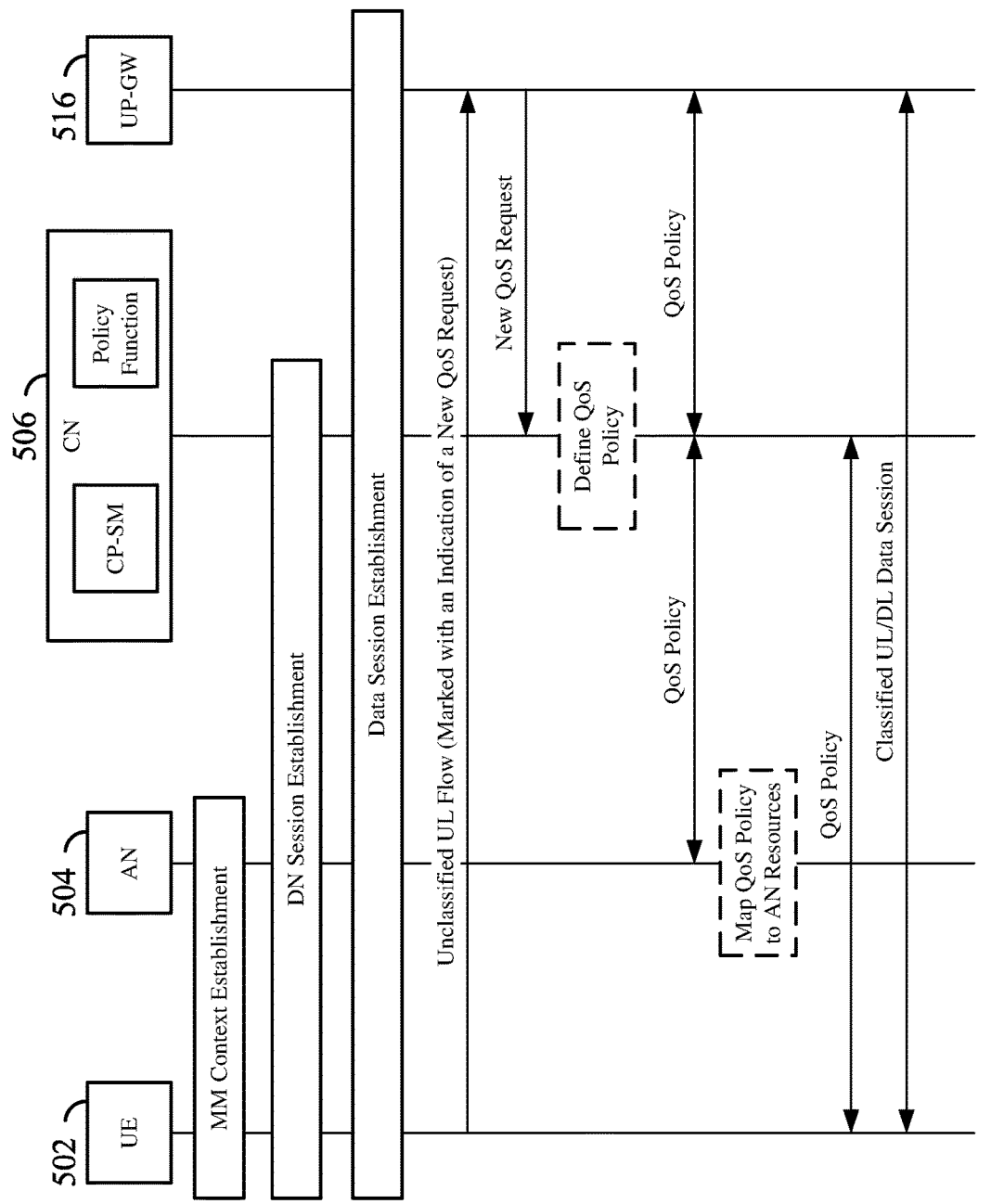
FIG. 11 is a call flow diagram illustrating an exemplary process for the establishment of a QoS policy responsive to, or triggered by, an explicit UE request for the QoS policy.

FIG. 11 is a call flow diagram illustrating an exemplary process for the establishment of a QoS policy responsive to, or triggered by, an explicit UE request for the UE policy. This process corresponds to the user-plane-based solution for handling an explicit QoS request from the UE 502 when initiating a data session, described above.

As with the above examples, an MM context is established between the UE 502 and the AN 504, a DN session is established between the UE 502 and the CN 506, and an associated data session is established between the UE 502 and the UP-GW 516. The UE 502 transmits an unclassified UL flow on the user plane to the UP-GW 516. In this example, the user plane data is marked, utilizing in-band user plane signaling, with an indication of a new QoS request that may include the QoS requirements, an application ID, an identifier of the data flow or the data flow QoS based on the QoS Policy the UE received from the CN 506, etc., as described above. In the illustrated example, in response, the UP-GW 516 transmits information relating to the QoS request to the CN 506. In another example (not illustrated), the AN 504 may detect the transmission of the unclassified UL flow marked with the indication of the new QoS request, and in response, the AN 504 may transmit information relating to the QoS request to the CN 506. The control plane of the CN 506 defines a QoS policy corresponding to the QoS request and provides the QoS policy to the AN 504 and the UP-GW 516. The AN 504 maps the QoS policy to the resources in the AN 504 as described above, e.g., by identifying a subset of QoS parameters (less than or all of the QoS parameters) within the QoS policy that apply to that AN 504, and applying the QoS policy according to that subset. Suitable resources are then established at the UE 502 and the CN 506 based on the AN resources and the QoS policy. At this point, the QoS classified data session may commence at the user plane in the UL and DL directions between the UE 502 and the UP-GW 516. Here, the UE 502 may utilize packet marking and QoS as indicated by the QoS policy for UL transmissions of the formerly unclassified data flow. For example, this may include information relating to an UL token, described below.

QoS Policy with Respect to DN Sessions and Data Sessions

In legacy 3GPP networks, QoS is defined for each data session. When utilizing the CN architecture described in the present disclosure, it is also possible to establish a QoS policy per data session, as in a legacy network. One such example of this strategy is described above and illustrated in FIG. 7. In this example, upon the establishment of a data session corresponding to a DN session, based on UE requirements provided in a data session establishment request, the UE subscription profile associated with the corresponding DN session, and network policies, a QoS policy may be established that applies specifically to that data session.

However, in a further aspect of the present disclosure, the QoS policy may be determined for, and may vary between, each DN session.

As described above (e.g., see FIG. 4), a UE 502 may establish one or more DN sessions 402a and/or 402b, each of which may have a set of one or more data sessions or PDU sessions. Each of the data sessions or PDU sessions may have its own IP address, or in other examples may be based on non-IP communication and may be capable of having distinct addressing.

In one aspect of the present disclosure, the QoS may be established for each DN session, acting as a sort of umbrella QoS policy that applies to all data sessions that may be established, which are associated with that DN session. That is, when a DN session is established between a UE 502 and a CN 506, the UE 502 may transmit a QoS request including a set of QoS parameters or requirements. Based on the QoS request, credentials that the UE 502 may use to establish the DN session, and network policies, the CN 506 may establish a QoS policy that applies to all data sessions that may be established corresponding to the DN session. Here, this QoS policy would be independent of the IP addresses allocated to different IP data sessions that may be later created, and independent of which UP-GW is serving the UE 502.

In this example, the QoS policy corresponding to that DN session may be provided to the AN 504, and to one or more UP-GWs, even before any data session is established in association with that DN session. The QoS policy may further be provided to the UE 502 upon creation of the DN session, so that it may be applied to all future data sessions belonging to that DN session.

The QoS policy applied to the DN session may contain one or more data session descriptors, which for the QoS associated with the DN session may contain a subset of the typical data session descriptor fields in order to enable the QoS policy to apply to one or more data sessions. For example, in the case of an IP data session, the data session descriptor in the QoS policy may contain all of the data session descriptor fields, except the source and destination IP address, since those will be allocated at the later time when a data session is actually established. In another example corresponding to the case of an IP data session, the data session descriptor in the QoS policy may contain only the transport protocol type (e.g., TCP) and/or port number for IP transport sessions. In this way, a data session may be established corresponding to that protocol type and/or port number independently of the source and destination IP address.

Figure 12:
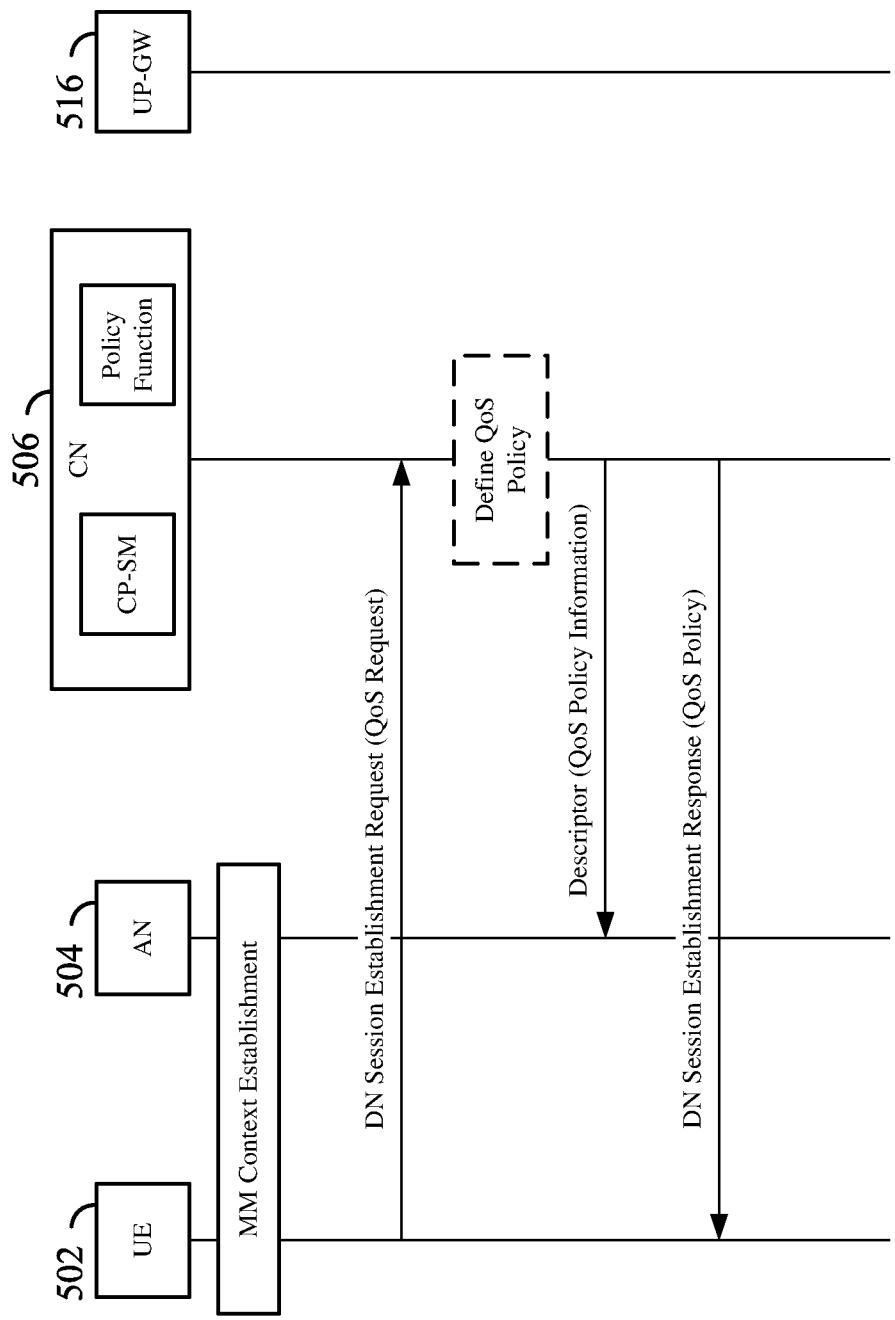
FIG. 12 is a call flow diagram illustrating an exemplary process for the establishment of a QoS policy with respect to a DN session at the time of DN session establishment, without data session establishment.

FIG. 12 is a call flow diagram illustrating an exemplary process for the establishment of a QoS policy in connection with a DN session. In this example, a data session is not established at the time that the DN session is established, although it will be understood that this is not necessarily to be the case (e.g., see FIG. 6).

As with the above examples, an MM context is established between the UE 502 and the AN 504. In this example, the UE 502 transmits a DN session establishment request to the CN 506 (i.e., to the CP-SM 510), including QoS request information. In response, the control plane of the CN 506 defines a QoS policy corresponding to the QoS request and transmits a descriptor, which may include QoS policy information, to the AN 504. The AN 504 may utilize this information to map to its resources as described above for the provision of QoS to future data sessions, or this mapping may be performed at a later time upon data session establishment. Further, the CN 506 transmits a DN session establishment response to the UE 502, including QoS policy information. In this way, the UE 502 may utilize this QoS policy for data sessions associated with the DN session.

AN Role

As described above, the AN 504 may in some examples perform the detection of a new data session using data session descriptors, and with no explicit awareness of services or applications. For the DL, these descriptors may be mapped to the AN QoS and dedicated AN resources (e.g., dedicated radio bearers). For the UL, the AN 504 may have pre-authorized data sessions set by the CN 506 on a per-UE basis. This differs from a typical legacy network, where the AN receives QoS policies corresponding to each particular data session.

In a further aspect, no deep packet inspection (DPI) need be performed at the AN 504. That is, no further traffic inspection may be needed beyond a limited amount of inspection of the data session descriptor 310 for data session descriptor matching. This may include matching of additional, optional in-band marking such as a QoS flow label 312.

The flexibility of the data session descriptor 310 used in the AN 504, and policy mapping in the AN 504, depends on the CN 506. For example, one QoS per flow vs. using a wildcard for one or more of the data session/data flow descriptor fields to identify a service or a priority class.

The AN 504 may perform UL data session detection with respect to QoS policy information. When this is not possible, if configured to do so, the AN 504 may enable forwarding of UL PDUs to the corresponding UP-GW 516 on best effort QoS, to enable UE-initiated undetected data sessions that will be processed, authorized, and policed at the UP-GW 516.

Application Detection/Awareness

In an aspect of the present disclosure, similar to the functionality of a legacy system, the CN 506 may detect and authorize data sessions with respect to the application or service to which the data session corresponds. For example, the detection of a data session may be performed by analyzing a packet (e.g., by DPI), or by virtue of an application function (AF) 522 that may request from the CN 506 the transport of a certain type of data flow with a specific QoS. Once the data session is detected and authorized, QoS information resulting from the detection may be distributed to the AN 504, the UP-GW 516, and the UE 502. The AN 504 may identify applications or services using configured IP tuple mapping via info/policies. These applications or services may then be dynamically delivered to the AN 504 on a per-UE/per-subscriber basis, in order to enable roaming The detection of the data sessions may further be supported by information that the UE 502 provides to the CN 506. As discussed above in relation to an explicit transmission of a QoS request from the UE 502 (see FIGS. 10-11 and their associated description), the UE 502 may be aware of the related QoS requirements for at least some applications or services, and may accordingly transmit an explicit QoS request, either utilizing user plane signaling or control plane signaling. With respect to the explicit QoS request utilizing control plane signaling, the UE 502 may provide an application identifier in CP signaling to the CN 506 for the purpose of establishing a data session. With respect to the explicit QoS request utilizing user plane signaling, the UE 502 may provide an application identifier in-band with the data traffic to enable the UP-GW 516 to trigger application detection in the CN 506.

CN to AN Explicit Requests

One goal for a CN 506 according to some aspects of the disclosure is for the CN 506 to be as agnostic to the access technology as possible. That is, ideally, the CN 506 would function in the same way for all ANs, without knowing details of the AN. However, due to differences in ANs and security concerns, this may not be possible to implement. Accordingly, some aspects of the present disclosure provide for the CN 506 to be enabled to provide to the AN 504 an AN-specific QoS request. In this way, each AN can receive different QoS treatment according to details of the AN or details of the application utilizing a data session over the AN.

For example, when a CN 506 requests a QoS setup in an AN 504 for a new data session for a given UE 502, the UE 502 may have established multiple DN sessions towards, e.g., different service providers (e.g., data networks). It may occur that data sessions belonging to different service providers may require handling by dedicated resources in the AN 504, resources that should not be shared with DN sessions not associated with that data session. For example, one requirement for a particular data session may be that it is encrypted with security keys that may be generated when the UE 502 connects to a particular application server. Further, a data session corresponding to a different application server may be secured with different security keys that are generated when the UE 502 connects to that application server. That is, in the case of a RAN with dedicated bearers, it may be required that the DRB transporting the traffic for a DN session is encrypted with separate keys than the DRB for a different DN session. As illustrated in FIG. 21, a UE may accordingly store one or more keys 2151 in memory 2105.

Therefore, according to an aspect of the present disclosure, when the CN 506 provides a QoS policy for a data session to the AN 504, the CN 506 may have the ability to convey to the AN 504 a specific indication that dedicated and separate resources (e.g., a dedicated radio bearer) are needed for that data session. Within this request, the CN 506 may further provide additional parameters or values, such as separate encryption or security required (further including the corresponding keys to be used), separate QoS required, etc. In this way, the AN 504 may take into consideration such requirements in the decision of how to allocate dedicated resources for the data session.

For existing data sessions, the request for the dedicated resources may be provided in an "AN connectivity modification" or "QoS modification" or "data session mapping modification" Request Message from the CN 506 to the AN 502, containing also an identifier of the corresponding existing DN/data session. For new data sessions, the request for the dedicated resources may be provided in an "AN connectivity establishment" or "QoS establishment" or "data session mapping establishment" Request Message from the CN 506 to the AN 504, also containing an identifier of the corresponding new DN/data session.

In response, the AN 504 may allocate the separate dedicated resources. For example, in the case of a RAN, the RAN may allocate a dedicated radio bearer for that data session.

Pre-Authorized QoS Policy

If the UE 502 has one or more applications that are latency-critical, or the UE 502 needs to send packets as soon as possible, pre-authorization of QoS for a data session on which that data may be transmitted can be quite useful. Accordingly, as discussed above, various aspects of the present disclosure provide for a mechanism to enable such pre-authorization of QoS for data sessions.

In further detail, a DN session may be established and, based on UE subscription profile and CN policies, a QoS policy may be established by the CN 506 (QoS shaping). Here, the CN 506 may provide the AN 504 a set of QoS policies for data sessions that the UE 502 can later establish without requiring explicit authorization by the CN 506 (i.e., such data sessions are pre-authorized). This pre-authorization does not necessarily require the creation of any dedicated resources in the AN 504. For example, with respect to a radio access network (RAN), some form of dedicated resources such as a dedicated radio bearer (DRB) may be required. In accordance with some aspects of the present disclosure, at the time of the transmission of a UL data flow utilizing a pre-authorized QoS policy, there need not be any such dedicated radio bearer established. That is, the AN 504 may receive a packet from a UE 502 prior to the establishment of a data session that utilizes the pre-authorized QoS policy. Here, the AN 504 may look at a packet descriptor in the packet, and may accordingly determine that the packet corresponds to the pre-authorized QoS policy and handle the packet accordingly.

However, in other examples, the AN 504 may establish such dedicated resources for future data sessions. Thus, PDUs corresponding to pre-authorized data sessions may be transported based on the pre-authorized information the UE 502 has been provided, e.g. using a "default" or "best effort" radio bearer or, if supported and defined in the RAN, via a dedicated bearer already established for other data sessions. If the data session is authorized and requires dedicated resources in the AN 504, the CN 506 may deliver QoS policy information to the AN 504 that may reserve dedicated resources (e.g. a dedicated bearer in the RAN) to transport the data.

As it should be recognized from the above, such pre-authorization of QoS is one way to effectively speed up the startup time for a data session without sacrificing security.

While the above describes behavior of the AN 504 for such pre-authorized QoS, another consideration is the CN 506 behavior. In one example, the CN 506 may select a default UP-GW and may provide the AN 504, in the QoS policy, the address (e.g., an IP address) of a default UP-GW to use for the pre-authorized data sessions. In another example, however, no default UP-GW need be defined. Here, the CN 506 may provide the AN 504, in the QoS policy, information to allow the AN 504 to select a suitable UP-GW 516 when such pre-authorized data sessions are established.

The descriptors that the CN provides to different nodes to describe the QoS policy may include suitable information for the respective nodes regarding the pre-authorized data sessions. For example, the QoS policy may include information identifying data session descriptors, containing a subset of the data session descriptor fields that enable the QoS policy to apply to one or more data sessions.

As one particular example, in the case of an IP session, the descriptors for UL traffic may contain all the data session descriptor fields minus destination IP address, and the descriptors for DL traffic may contain all the data session descriptor fields minus the source IP address, since at the DN session creation, the address of the end point (e.g., the application server) may not be known yet.

As another particular example, in the case of IP session, the descriptors for both UL and DL traffic may contain all the data session descriptor fields in a data session PDU header, minus the source and destination IP address, since at the DN session creation, the address allocated to the UE 502 and the address of the end point (e.g., the application server in an external data network 518) are not known yet.

When the UE 502 then generates a data session, based on the two options described above (having a default IP address for the UP-GW 516, or having no default IP address and enabling the AN 504 to select a suitable UP-GW), the UE may have two different courses of action.

In the first option, corresponding to a default IP address being defined, when the UE 502 generates UL traffic that matches the pre-authorized QoS policy, the default IP address is associated with the data session, and the PDUs are sent to a specific end point selected by the UE 502. Here, both the UE 502 and the AN 504 apply the corresponding QoS policy.

In the second option, corresponding to no default IP address, upon DN session establishment the UE 502 may determine to send user plane PDUs corresponding to a pre-authorized QoS policy received from the CN 506. Here, the allocation of transport resources may be accomplished in two ways. In one alternative, the UE 502 may trigger the allocation of transport resources, e.g., via access stratum (AS) signaling to the AN 504. Here, a UE 502 may request transport resources for a new data session, and the UE 502 may provide the information corresponding to the data session being established (e.g., a partial data session descriptor for the data session and matching the preauthorized QoS policy). In another alternative, for an IP data session, the UE 502 may transmit a request for an IP address assignment (e.g., an IP address allocation request) containing the information corresponding to the data session being established. For example, this request may utilize DHCP for IP address allocation, and the AN 504 may act as a DHCP proxy.

In either case, the AN 504 verifies the information received from the UE 502 in the request with respect to the pre-authorized QoS policy. If they match, the AN 504 may then use the information in the pre-authorized QoS policy to select a UP-GW 516 (if none was provided by the CN 506 in the QoS policy). Further, for IP data sessions, the AN 504 may request an IP address for the UE 502 from the UP-GW 516. The procedure may also establish a tunnel between the AN 504 and the UP-GW 516 for the routing of PDUs.

If the data session establishment is successful, the AN 504 may then confirm to the UE 502 the establishment of the transport resources. For IP sessions, this may include returning the IP address to the UE 502. The UE 502 may then transmit UL PDUs that match the pre-authorized QoS policy.

While the above has discussed an explicit method of establishing a data session utilizing a pre-authorized QoS policy, in another aspect of the disclosure, an implicit method for data session establishment may be utilized. Here, when the UE 502 detects that it has data to send that matches one of the pre-authorized QoS policies, if the UE 502 has an IP address or dedicated AN resources that the AN 504 has created upon delivery of the pre-authorized QoS policy, the UE 502 may simply utilize those resources. However, if the UE 502 does not have an IP address to which to send those packets, the UE 502 may transmit its UL PDUs over some default bearer or best effort bearer to the AN 504. When the AN 504 detects UL traffic corresponding to a pre-authorized QoS policy that requires dedicated resources in the AN 504, the AN 504 may then establish the dedicated resources. Once such resources are established, both the UE 502 (for UL PDUs) and the AN 504 (for DL PDUs) may use the dedicated resources for PDUs matching the pre-authorized QoS policy.

Figure 13:
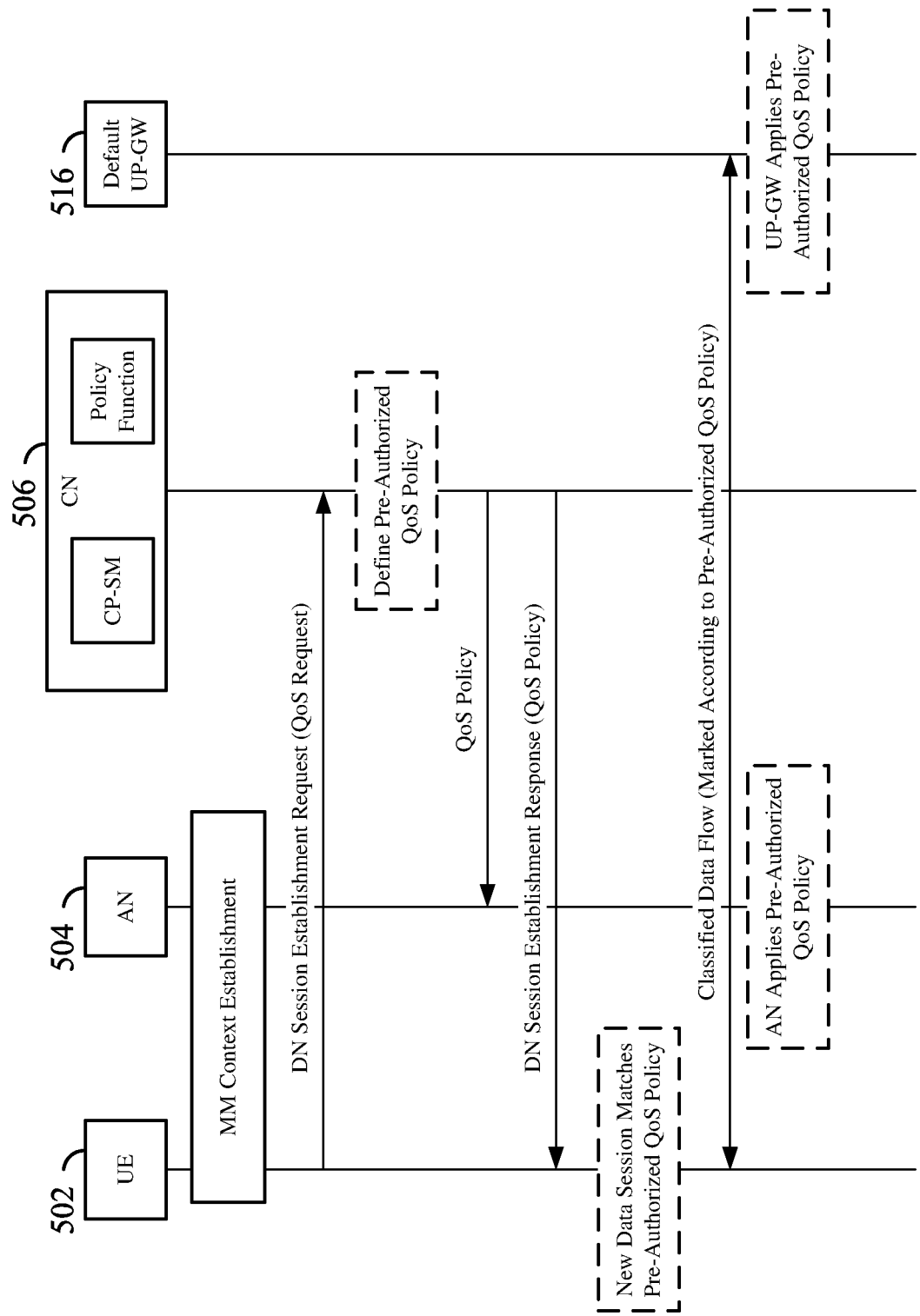
FIG. 13 is a call flow diagram illustrating an exemplary process for pre-authorized QoS policy establishment at the time of a DN session establishment, before a data session has been established.

FIG. 13 is a call flow diagram illustrating an exemplary process for pre-authorized QoS policy establishment at the time of a DN session establishment, before a data session has been established. This process illustrates the first option described above, wherein a default IP address for the UP-GW is established for the pre-authorized data session.

As with the above example, an MM context is established between the UE 502 and the AN 504, the UE 502 transmits a DN session establishment request to the CN 506 including QoS request information, the CN 506 defines a pre-authorized QoS policy corresponding to the QoS request, and the CN 506 transmits a descriptor, which may include QoS policy information, to the AN 504. In this example, the CN 506 additionally transmits a DN session establishment response to the UE 502 in response to the DN session establishment request, including the QoS policy information as well as an address (e.g., an IP address) of a default UP-GW 516 for pre-authorized data flows.

When the UE 502 has data to transmit utilizing a new data session that matches a pre-authorized QoS policy, the UE 502 may begin transmission of the data on a classified data flow, marked according to a pre-authorized QoS policy. The UE transmission may be directed or addressed to the default UP-GW 516 identified in the QoS policy information for pre-authorized data sessions. The AN 504 may then apply the pre-authorized QoS policy to the data flow and direct the flow to the default UP-GW 516, which may additionally apply the pre-authorized QoS policy for communication with the UE 502.

Figure 14:
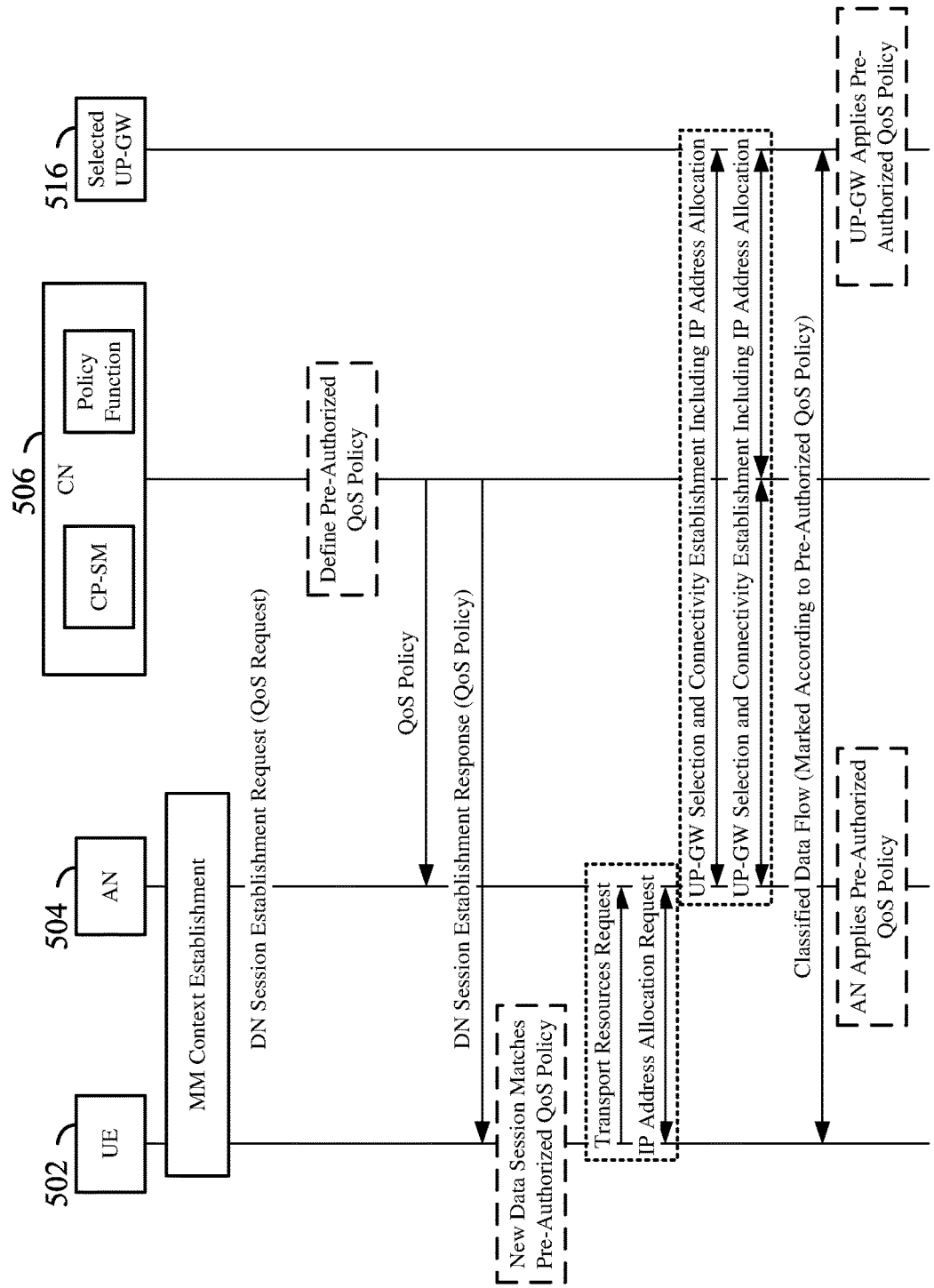
FIG. 14 is a call flow diagram illustrating another exemplary process for pre-authorized QoS policy establishment at the time of a DN session establishment, before a data session has been established

FIG. 14 is a call flow diagram illustrating another exemplary process for pre-authorized QoS policy establishment at the time of a DN session establishment, before a data session has been established. This process illustrates the second option described above, wherein no default UP-GW is established but the AN 504 is provisioned with information that enables it to select a suitable UP-GW 516.

As with the above example, an MM context is established between the UE 502 and the AN 504, the UE 502 transmits a DN session establishment request to the CN 506 including QoS request information, the CN 506 defines a pre-authorized QoS policy corresponding to the QoS request, and the CN 506 transmits a descriptor, which may include QoS policy information, to the AN 504. In this example, the CN 506 additionally transmits a DN session establishment response to the UE 502 in response to the DN session establishment request, including the QoS policy information.

When the UE 502 has data to transmit utilizing a new data session that matches a pre-authorized QoS policy, as discussed above, there are two different possibilities, illustrated within a dashed-line box. In one option, the UE 502 may transmit an access stratum (AS) transport resources request to the AN 504 to request transport resources for an UL transmission. In the other option, the UE 502 may transmit an IP address allocation request to request assignment of an IP address.

In response, two different possibilities may be implemented at the AN 504, illustrated within another dashed-line box. In one option, the AN 504 may select a suitable UP-GW and establish the resources. In the other option, the AN 504 may interact with the control plane functionality of the CN 506 and thereby select a suitable UP-GW 516 and establish the resources. The UE may then begin transmission of the data on a classified data flow, marked according to a pre-authorized QoS policy. The UE transmission may be directed or addressed to the selected UP-GW 516 identified in the QoS policy information for pre-authorized data sessions. The AN 504 may then apply the pre-authorized QoS policy to the data flow and direct the flow to the selected UP-GW 516, which may additionally apply the pre-authorized QoS policy for communication with the UE 502.

AN Rejection of a QoS Policy

Above, QoS policies have been discussed wherein the CN 506 makes a decision relating to the QoS policy, and distributes this QoS policy to the AN 504, the UE 502, and the UP-GW 516. Here, it has essentially been assumed that all goes well, and the respective nodes apply the QoS in accordance with the determination made by the CN 516.

However, in some cases, such as when an AN lacks resources to support the QoS requirements, or when the AN has local policies that prohibit it from allowing the QoS requirements (e.g., based on real-time conditions such as the loading, congestion, etc.), the AN 504 may reject the QoS policy for a data session (a new data session or the QoS modification for an existing data session). Typically, if the AN 504 rejects the QoS policy, the AN 504 simply does not provide the QoS. In some cases, this may result in a data session failing to connect. According to various aspects of the present disclosure, three options may be employed to handle these cases.

Figure 15:
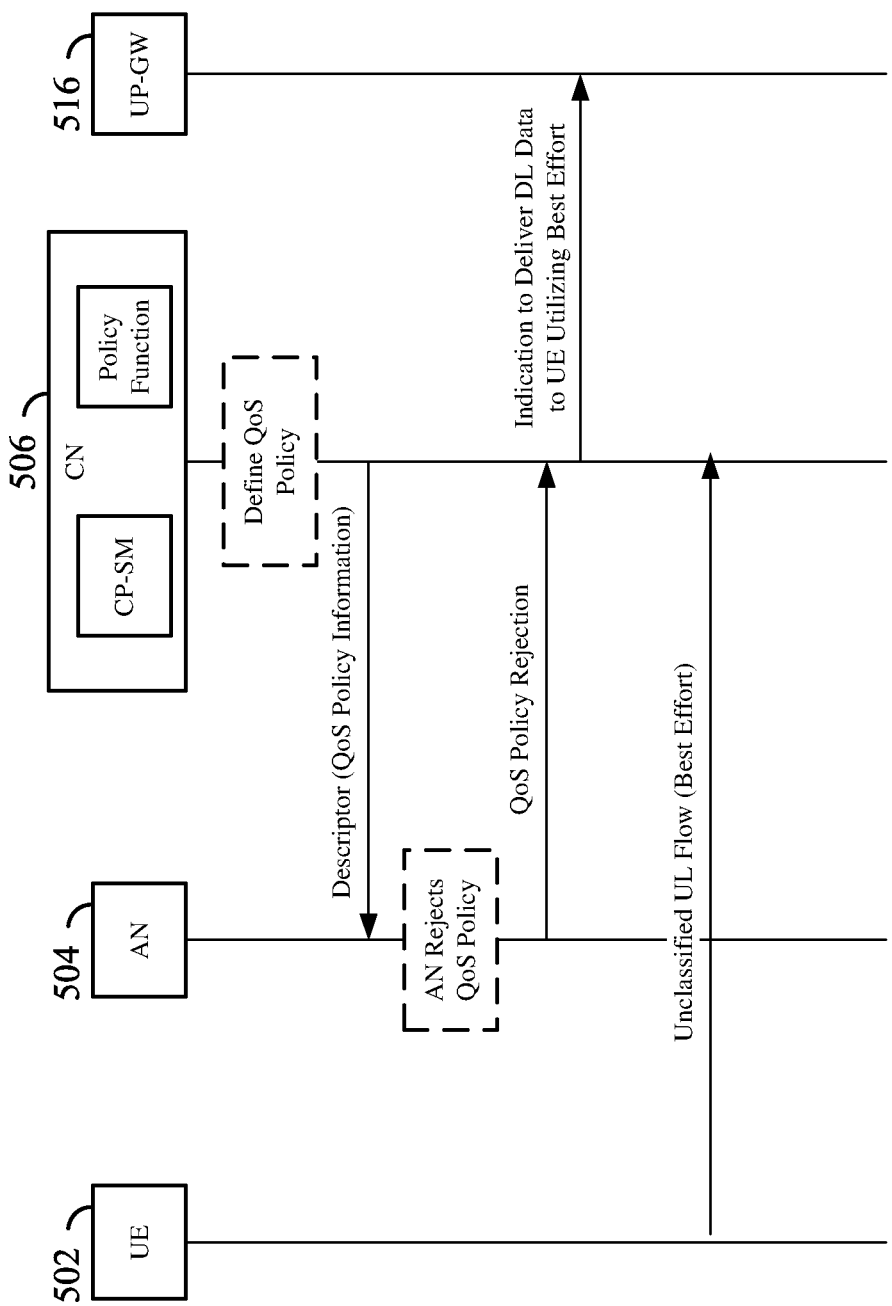
FIGS. 15-17 are call flow diagrams illustrating exemplary processes for handling an access network (AN) rejection of a QoS policy.

A first option is illustrated in a call flow diagram of FIG. 15. Here, a CN 506 may define a QoS policy and transmit a descriptor including QoS policy information to an AN 504. When the AN 504 rejects the QoS policy, in this example, the AN 504 transmits an indication of the QoS policy rejection to the CN 506. Here, the CN 506 may simply not enforce the QoS, and a flow between the UE 502 and the CN 506 may be transported as best effort. Accordingly, the CN 506 may indicate to the UP-GW 516 to deliver DL traffic utilizing best effort. Further, the AN 504 and the UE 502 may deliver UL traffic as best effort. The CN 506 may need to negotiate with an application server or the UE 502 regarding the decision (where the negotiation may be just a notification).

Figure 16:
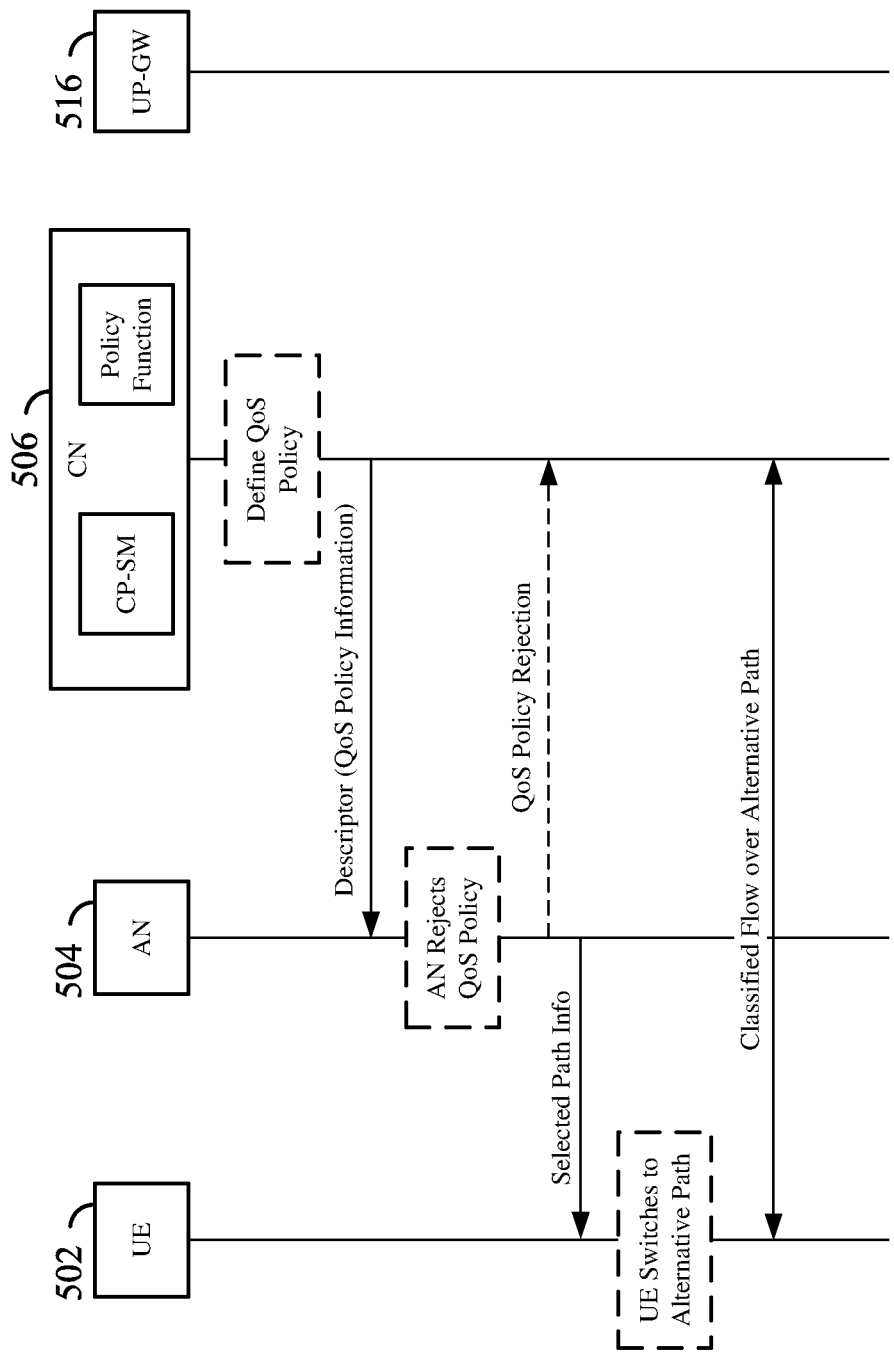

A second option is illustrated in a call flow diagram of FIG. 16. Here a CN 506 may define a QoS policy and transmit a descriptor including QoS policy information to an AN 504. When the AN 504 rejects the QoS policy, in this example, the AN 504 may optionally transmit an indication of the QoS policy rejection to the CN 506. Here, the AN 504 may seek to find an alternative path for the traffic. For example, in the case where the AN 504 is a radio access network (RAN), the UE 502 may generally perform channel or path characterization, e.g., by measuring other neighboring cells in that RAN or in other RANs according to the UE's capabilities. The UE 502 may accordingly provide information relating to the channel or path characterization to the AN 504. Based on path information such as these measurements by the UE 502, the AN 504 may select an alternative path, e.g., by handing over the UE 502 to another cell or access technology, and the AN 504 may accordingly transmit information about the selected path to the UE 502. Depending on the configuration of the AN 504, the AN 504 may be able to switch the data session to another cell or access technology that can fulfill the requirement. Accordingly, a classified flow may be established between the UE 502 and the CN 506 over the selected alternative path. If the AN 504 chooses to trigger the handover to another technology, the AN 504 may trigger a handover request to the CN 506 and, upon successful handover preparation, the AN 504 indicates to the CN 506 that the requested QoS can be satisfied by the target AN.

Figure 17:
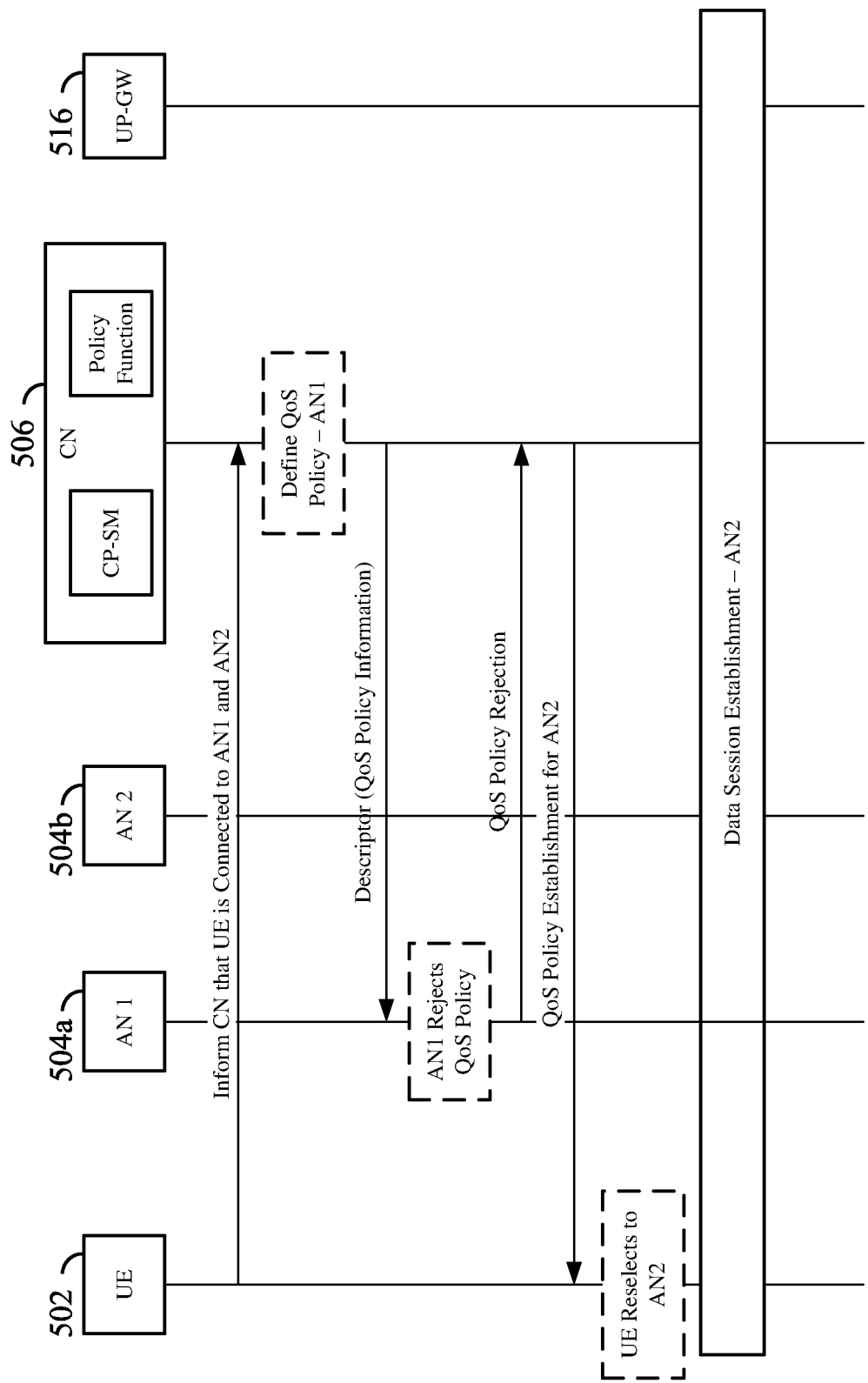

A third option is illustrated in a call flow diagram of FIG. 17. Here, the CN 506 may know that the UE 502 is connected to multiple ANs 504a and 504b (e.g., different cellular RANs, or a cellular RAN and a Wi-Fi network, etc.) for, e.g., different data sessions. The CN 506 may define a QoS policy and transmit a descriptor including QoS policy information to AN1 504a. When AN1 504a rejects the QoS policy, AN1 504a may transmit an indication of the QoS policy rejection to the CN 506. When the CN 506 receives a rejection by AN1 504a for the requested QoS, the CN 506 may trigger the QoS establishment on another AN that the UE 502 is using (e.g., AN2 504b) based on local policies defining which data session can be transported over which access technology. The CN 506 may then transmit an indication to the UE 502 to move the data session to such other AN2 504b. The information from the CN 506 to the UE 502 may be conveyed in AS signaling (if any is present, with the CN 506 first providing the information to AN1 504a that rejected the QoS request), or in NAS signaling. This signaling may indicate which data sessions and/or the new QoS for existing data sessions are to be used over the new AN2 504b (i.e., for the UE 502 to move the data sessions to the new AN). Accordingly, a classified data session may be established utilizing the new AN2 504b.

Token Label

A QoS policy generally is defined based on a subscriber profile (user subscription profile). The flows or data sessions to which the QoS policy is to be applied are identified, and the CN 506 triggers QoS shaping and creates a QoS policy. If a UE 502 has multiple data sessions or data flows with different QoS requirements, the CN 506 may accordingly need to establish a sufficient number of QoS policies, and may identify data sessions that require special treatment. Typically, this is accomplished by putting each packet sent to/from the UE 502 through traffic flow template (TFT) or service data function (SDF) filters.

However, a token may be utilized to achieve these same goals but in a much simpler way. That is, a token may provide information that allows an entity such as the CN 506 to identify that an IP packet belongs to a particular flow, but without creating bearers and filters, as described above.

Each flow may be assigned a token. Here, rather than applying the filters, described above, the entity that needs to identify the packet as belonging to a certain flow may simply verify the token by determining whether the content of the token matches with information in a table. Use of the token in this manner can be very fast, and when the token is cryptographically generated, can provide robust security. Use of the token further allows in-band identification of the flows, instead of filtering of the flow in the CN 506.

There may be two types of token—a DL token and an UL token. The DL token is applicable to data traffic coming from an application server that generates the traffic, which may be enhanced to support the DL token. For example, if a UE 502 is connected to a streaming video service, the corresponding server may apply a DL token to the packets so that when the packets reach the UP-GW 516 the token is mapped to the QoS to be applied to that flow.

The CN 506 defines an UL token and provides the token to the UE 502. As illustrated in FIG. 21, the token 2153 may be stored in memory 2105 at the UE 502. In this way, the UE 502 may thereby apply the UL token to packets in the UL. The UL token may be used when the application server cannot send a token, or has not been modified to apply the tokens to the packets. Because most sessions are initiated by the UE 502, the UE 502 will send packets for that session with the UL token. The UP-GW 516 will identify the token and determine that it can handle the packets according to the QoS policy, and may determine that the packets are authorized, and accordingly, the DL packets that match the information in those UL packets can be automatically authorized thanks to the presence of the UL token.

The UL token, if used alone, could function for authorization and policing of data flows. That is, the UL token may be considered a reflective token, wherein the fact that there is a token in the UL authorizing the traffic means that the corresponding DL traffic is authorized. In this case, it may be assumed that the DL traffic is by default turned off until an UL token is detected by the UP-GW 516, which confirms that the DL traffic corresponding to it is authorized.

The use of both an UL token and a DL token solves issues that may arise when utilizing an UL token alone, and also enables better differentiation/easier processing for traffic from specific SPs.

More specifically, the CN 506 may create a token label and transmit the token to the UE 502 based on the subscription profile, service/application requirements, and network policies, where each token label is associated with a data session that belongs to a certain QoS policy. Token label assignment does not need to be done during the DN session or data session establishment; instead, it can be done on-demand by the UE 502. A token label may in some examples include QoS parameters (e.g. QCI if used in a 5G CN).

A data session or data flow may be defined in various granularities, e.g., source and destination IPs, IP 5 tuples, or source IP and destination prefix, etc. The CN 506 provides the token label to the corresponding UP-GW 516 together with the QoS policy and any other policies for treatment of PDUs. When the UP-GW 516 receives an UL PDU from the UE 502 containing a token label, the UP-GW 516 (in collaboration with control plane entities in the CN 506) verifies the token label, authorizes the packet, and enforces the QoS/applies policies based on the token label.

For DL PDUs containing a token label (e.g., added to the PDUs by the originating end point, such as an application server), the UP-GW 516 (in collaboration with control plane entities in the CN 506) verifies the token label, authorizes the packet, and enforces the QoS/applies policies based on the token label. The UP-GW 516 may leave the token label in the PDU for processing at the AN 504. The CN 506 further provides the UL token label to the UE 502 with the associated data session descriptor for mapping to different data sessions. For UL PDUs, the UE 502 identifies the token label corresponding to the PDU based on the provided data session descriptor and embeds the label in the packet.

The CN 506 may provide the UL token label and/or DL token label to the AN 504. For UL PDUs, if provided with a token label corresponding to a PDU data session descriptor, the AN 504 verifies the token label, authorizes the packet, and enforces the QoS and/or applies policies based on the token label. For UL PDUs, if provided with a token label corresponding to a PDU data session descriptor, the AN 504 maps the token label to the AN resources needed to carry the PDU over the AN 504.

Figure 18:
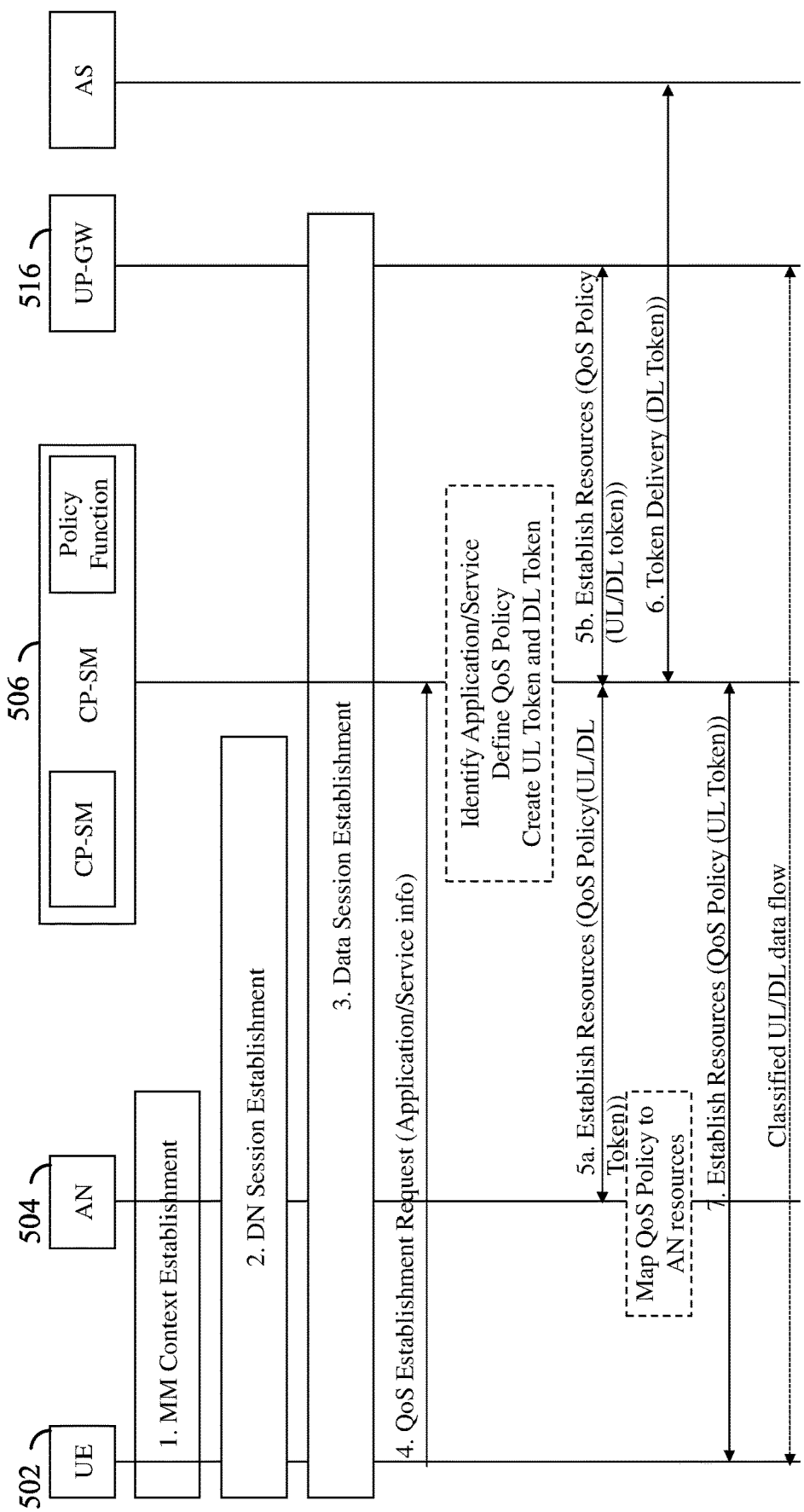
FIG. 18 is a call flow diagram illustrating an exemplary process for QoS policy establishment and uplink/downlink (UL/DL) token establishment utilizing control plane signaling.
Figure 19:
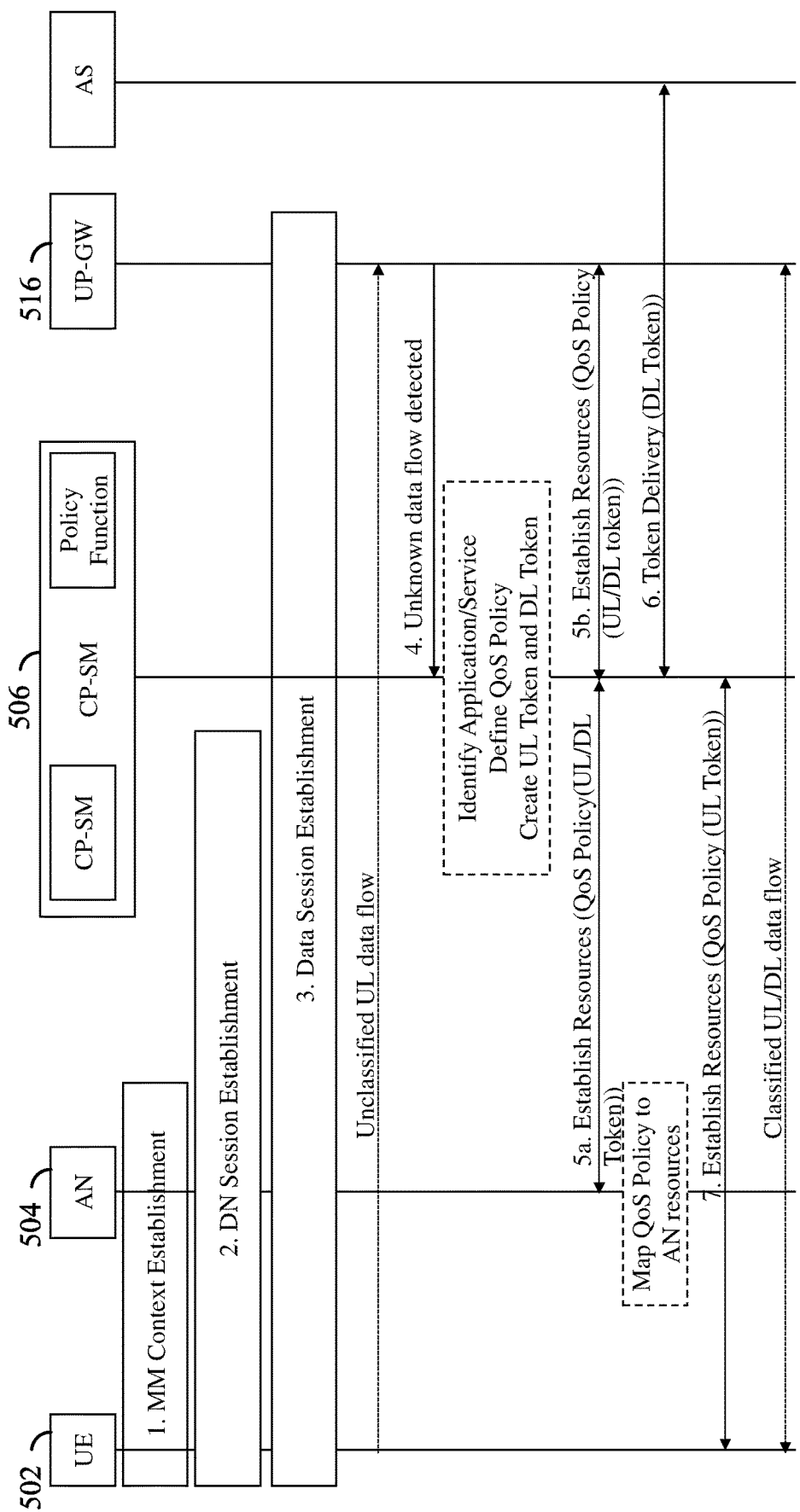
FIG. 19 is a call flow diagram illustrating an exemplary process for QoS policy establishment and implicit UL/DL token establishment utilizing user plane signaling.
Figure 20:
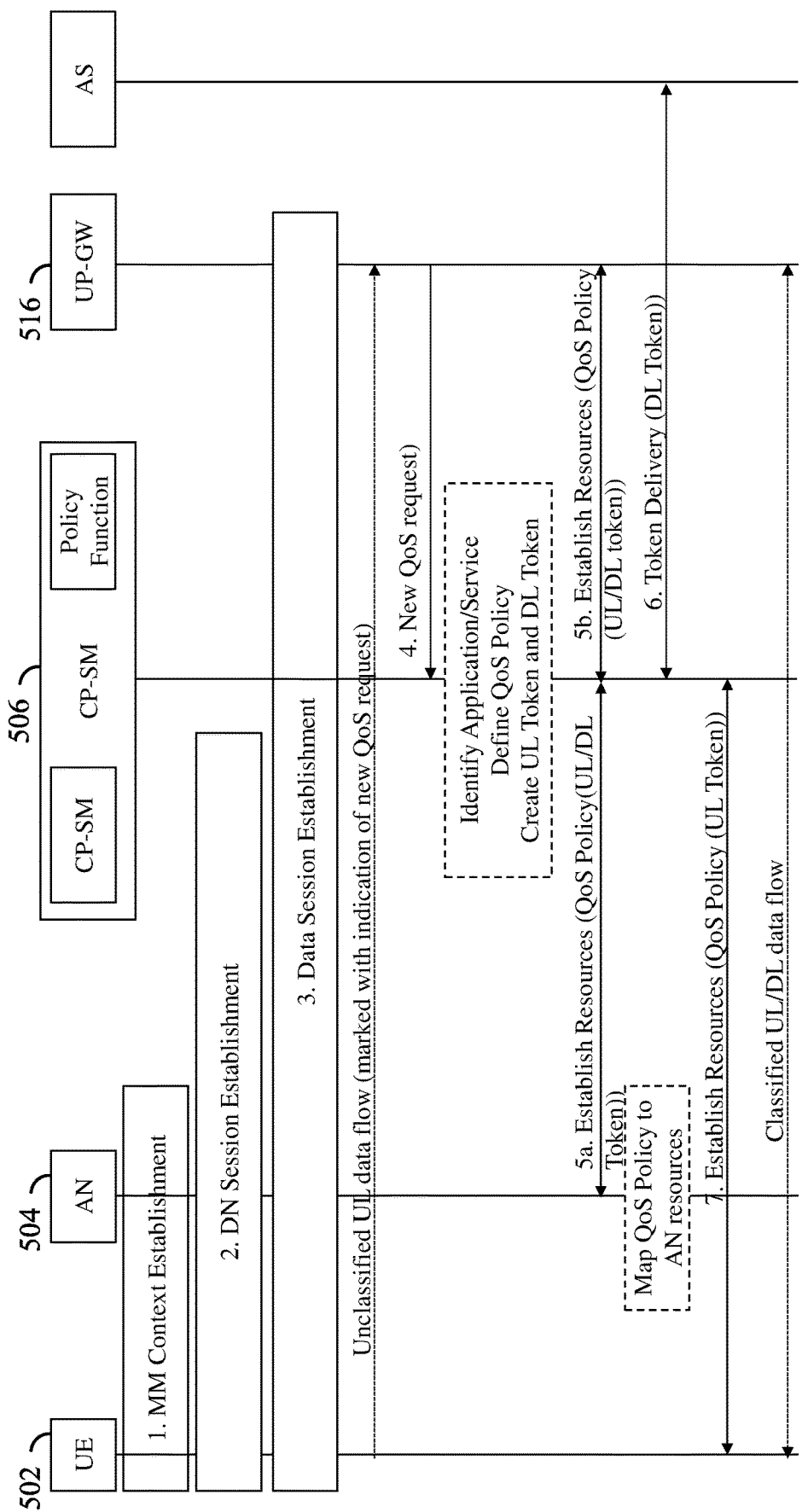
FIG. 20 is a call flow diagram illustrating an exemplary process for QoS policy establishment and explicit UL/DL token establishment utilizing user plane signaling.

FIGS. 18-20 illustrate various examples of QoS policy establishment and token establishment as they may be implemented according to certain aspects of the disclosure.

FIG. 18 is a call flow diagram illustrating an exemplary process for QoS policy establishment and UL/DL token establishment utilizing control plane signaling.

An MM context is established between the UE 502 and the AN 504, a DN session is established between the UE 502 and the CN 506, and an associated data session is established between the UE 502 and the UP-GW 516. In this example, the UE 502 transmits an explicit QoS request utilizing out-of-band CP signaling. The explicit QoS request may include the QoS requirements, an application ID, etc. The control plane of the CN 506 identifies the application or service corresponding to the application ID, defines a QoS policy corresponding to the QoS establishment request, and creates an UL token and a DL token. The CN 506 then provides the QoS policy to the AN 504 and the UP-GW 516, and optionally delivers the DL token to an application server in an external network. The AN 504 maps the QoS policy to the resources in the AN 504 as described above, e.g., by identifying a subset of QoS parameters (less than or all of the QoS parameters) within the QoS policy that apply to that AN 504, and applying the QoS policy according to that subset. Suitable resources are then established at the UE 502 and the CN 506 based on the AN resources and the QoS policy. At this point, the QoS classified data session may commence at the user plane in the UL and DL directions between the UE 502 and the UP-GW 516. Here, the UE 502 may utilize packet marking and QoS as indicated by the QoS policy for UL transmissions of the formerly unclassified data flow. For example, this may include information relating to an UL token.

FIG. 19 is a call flow diagram illustrating an exemplary process for QoS policy establishment and implicit UL/DL token establishment utilizing user plane signaling. As with the above example, an MM context is established between the UE 502 and the AN 504, a DN session is established between the UE 502 and the CN 506, and an associated data session is established between the UE 502 and the UP-GW 516. In this example, the UE 502 may transmit an unclassified (e.g., not explicitly indicated as belonging to a particular application or service) data flow on the uplink A typical example of such an unclassified data flow transmission may correspond to a request for a TCP session for a Web browser or other application. The UP-GW 516 detects that the UE 502 has transmitted a new flow that has not been classified and transmits an unknown data flow detected indication to the control plane of the CN 506. The control plane of the CN 506 identifies the application or service based on the application ID, defines a QoS policy corresponding to one or more characteristics of the unclassified flow and provides the QoS policy to the AN 504 and the UP-GW 516, and creates an UL token and a DL token. The control plane of the CN 506 then provides the QoS policy to the AN 504 and optionally delivers the DL token to the application server corresponding to the identified application. The AN 504 maps the QoS policy to the resources in the AN 504 as described above, e.g., by identifying a subset of QoS parameters (less than or all of the QoS parameters) within the QoS policy that apply to that AN 504, and applying the QoS policy according to that subset. Suitable resources are then established at the UE 502 and the CN 506 based on the AN resources and the QoS policy. At this point, the QoS classified data session may commence at the user plane in the UL and DL directions between the UE 502 and the UP-GW 516. Here, the UE 502 may utilize packet marking and QoS as indicated by the QoS policy for UL transmissions of the formerly unclassified data flow. For example, this may include information relating to an UL token, described below.

FIG. 20 is a call flow diagram illustrating an exemplary process for QoS policy establishment and explicit UL/DL token establishment utilizing user plane signaling. As with the above examples, an MM context is established between the UE 502 and the AN 504, a DN session is established between the UE 502 and the CN 506, and an associated data session is established between the UE 502 and the UP-GW 516. The UE 502 transmits an unclassified UL flow on the user plane to the UP-GW 516. In this example, the user plane data is marked, utilizing in-band user plane signaling, with an indication of a new QoS request that may include the QoS requirements, an application ID, etc., as described above. In response, the UP-GW 516 transmits information relating to the QoS request to the CN 506. The control plane of the CN 506 identifies the application corresponding to the application ID, defines a QoS policy corresponding to the QoS request, and creates an UL token and a DL token. The control plane of the CN 506 then provides the QoS policy to the AN 504 and the UP-GW 516, and optionally delivers the DL token to the application server in the external network. The AN 504 maps the QoS policy to the resources in the AN 504 as described above, e.g., by identifying a subset of QoS parameters (less than or all of the QoS parameters) within the QoS policy that apply to that AN 504, and applying the QoS policy according to that subset. Suitable resources are then established at the UE 502 and the CN 506 based on the AN resources and the QoS policy. At this point, the QoS classified data session may commence at the user plane in the UL and DL directions between the UE 502 and the UP-GW 516. Here, the UE 502 may utilize packet marking and QoS as indicated by the QoS policy for UL transmissions of the formerly unclassified data flow. For example, this may include information relating to an UL token, described below.

FIG. 21 is a block diagram illustrating an example of a hardware implementation for a UE 502 employing a processing system 2114. For example, the UE 502 may be the UE described above and illustrated in any one or more of FIG. 1, 2, or 4-20.

The UE 502 may be implemented with a processing system 2114 that includes one or more processors 2104. Examples of processors 2104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 502 may be configured to perform any one or more of the functions described herein. That is, the processor 2104, as utilized in a UE 502, may be used to implement any one or more of the processes described herein and illustrated in FIG. 6-20, 23, or 24.

In this example, the processing system 2114 may be implemented with a bus architecture, represented generally by the bus 2102. The bus 2102 may include any number of interconnecting buses and bridges depending on the specific application of the processing system 2114 and the overall design constraints. The bus 2102 communicatively couples together various circuits including one or more processors (represented generally by the processor 2104), a memory 2105, and computer-readable media (represented generally by the computer-readable medium 2106). The bus 2102 may also link various other circuits such as timing sources, peripherals, voltage regulators, and power management circuits, which are well known in the art, and therefore, will not be described any further. A bus interface 2108 provides an interface between the bus 2102 and a transceiver 2110. The transceiver 2110 provides a means for communicating with various other apparatus over a transmission medium. In some examples, the transceiver 2210 may be a wireless transceiver for communication with a radio access network (RAN). Depending upon the nature of the apparatus, a user interface 2112 (e.g., keypad, display, speaker, microphone, joystick) may also be provided.

The processor 2104 is responsible for managing the bus 2102 and general processing, including the execution of software stored on the computer-readable medium 2106. The software, when executed by the processor 2104, causes the processing system 2114 to perform the various functions described below for any particular apparatus. The computer-readable medium 2106 and the memory 2105 may also be used for storing data that is manipulated by the processor 2104 when executing software.

The processor 2104 may include channel/path characterization circuitry 2141 configured to characterize a channel or path for the purpose of assisting the AN 504 in finding an alternative path for traffic. For example, in the case where the AN 504 is a radio access network (RAN), the channel/path characterization circuitry 2141 may generally perform a channel or path characterization, e.g., by measuring other neighboring cells in that RAN or in other RANs according to the UE's capabilities. The channel/path characterization circuitry 2141 may operate in coordination with channel/path characterization software 2161.

The processor 2104 may further include QoS request circuitry 2142 configured to request a suitable QoS for a data session, utilizing an explicit QoS request, or an implicit QoS request where the CN 506 detects an UL flow sent by the UE 502. The QoS request circuitry 2142 may operate in coordination with QoS request software 2162 and/or an application program interface (API) 2164 configured to explicitly request a QoS.

The processor 2104 may further include flow labeling circuitry 2143 configured for applying a suitable flow label to packets. In this way, QoS management may be enabled without a need for nodes to perform deep packet inspection (DPI). The flow labeling circuitry 2143 may operate in coordination with flow labeling software 2163.

One or more processors 2104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2106. The computer-readable medium 2106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2106 may reside in the processing system 2114, external to the processing system 2114, or distributed across multiple entities including the processing system 2114. The computer-readable medium 2106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 22:
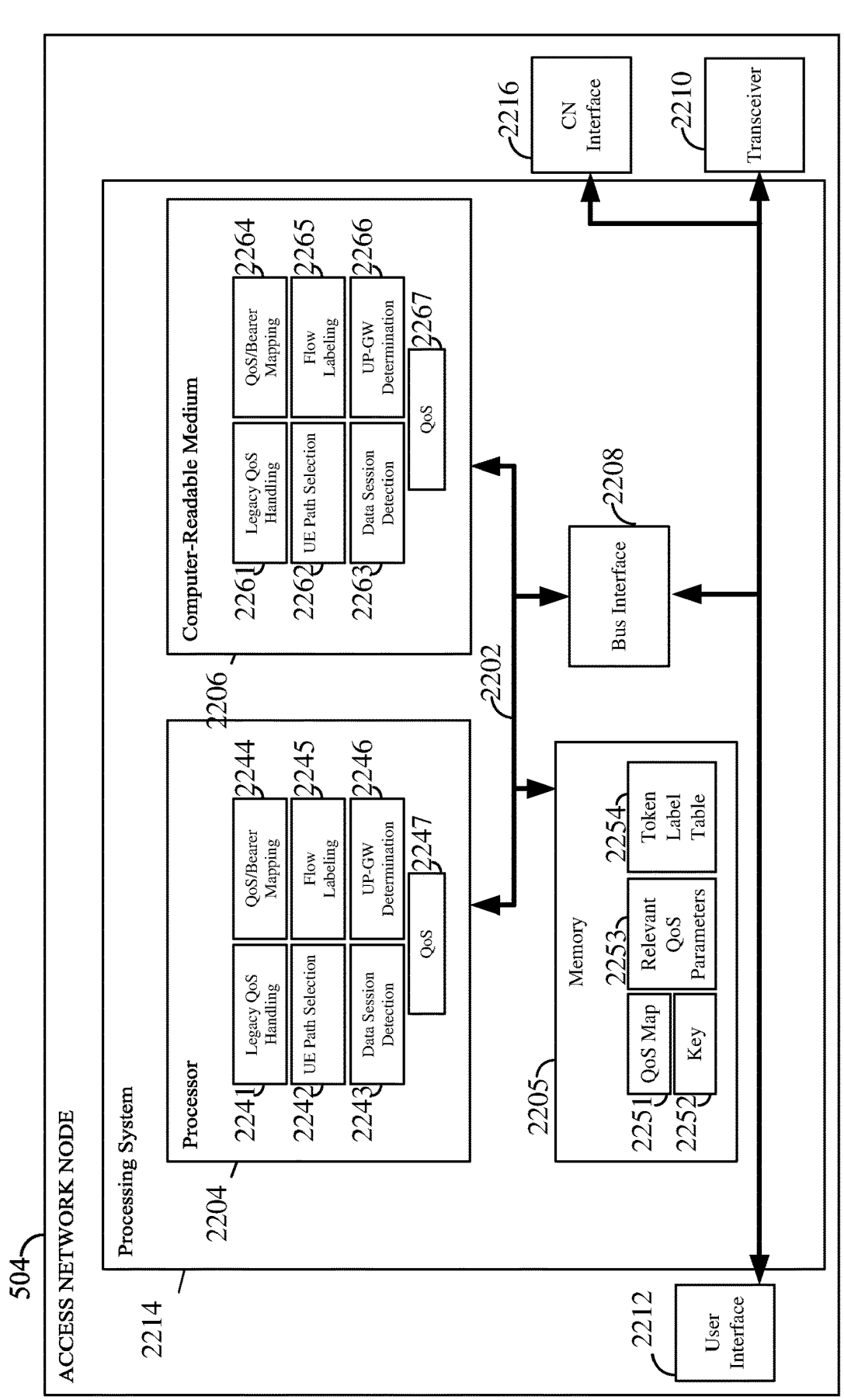
FIG. 22 is a block diagram illustrating an example of a hardware implementation for an access network node employing a processing system.

FIG. 22 is a conceptual diagram illustrating an example of a hardware implementation for an access network node 504 employing a processing system 2214. In accordance with various aspects of the disclosure, an element, or any portion of an element, or any combination of elements may be implemented with a processing system 2214 that includes one or more processors 2204. For example, the access network node 504 may be a base station or other node in an access network (AN) as illustrated in any one or more of FIG. 1, 2, or 4-20.

The processing system 2214 may be substantially the same as the processing system 2114 illustrated in FIG. 21, including a bus interface 2208, a bus 2202, memory 2205, a processor 2204, and a computer-readable medium 2206. Furthermore, the access network node 504 may include a user interface 2212 and a transceiver 2210 substantially similar to those described above in FIG. 21. The access network node 504 may further include a CN communication interface 2216 (e.g., a backhaul interface) configured for communication with a CN 506. That is, the processor 2204, as utilized in an access network node 504, may be used to implement any one or more of the processes described herein and illustrated in FIG. 6-20, 23, or 24.

The processor 2204 may include legacy QoS handling circuitry 2241 configured for QoS management of a flow utilizing legacy QoS parameters (e.g., parameters corresponding to a network other than the network implementing the QoS policy) in cases where the UE 502 is connected to a legacy AN. The legacy QoS handling circuitry 2241 may operate in coordination with legacy QoS handling software 2261.

The processor 2204 may further include UE path selection circuitry 2242 configured for finding a suitable path for traffic corresponding to a QoS policy. In some examples, the UE path selection circuitry 2242 may seek for an alternative path for traffic according to channel or path characterization information from a UE 502, and select an alternative path, e.g., by handing over the UE 502 to another cell or access technology. The UE path selection circuitry 2242 may operate in coordination with legacy UE path selection software 2262.

The processor 2204 may further include data session detection circuitry 2243 configured for detecting new data sessions using data session descriptors. The data session detection circuitry 2243 may operate in coordination with data session detection software 2263.

The processor 2204 may further include QoS/bearer mapping circuitry 2244 configured for mapping flow labels or descriptors to parameters or information such as a QoS policy. The QoS/bearer mapping circuitry 2244 may operate in coordination with QoS/bearer mapping software 2264.

The processor 2204 may further include flow labeling circuitry 2245 configured for applying flow labels to packets. The flow labeling circuitry 2245 may operate in coordination with flow labeling software 2265.

The processor 2204 may further include UP-GW determination circuitry 2246 configured for selecting a UP-GW for use by a new pre-authorized flow. The selected UP-GW may be a default UP-GW identified by the CN 506 in QoS policy info, or a suitable UP-GW selected based on the data session PDU and the information provided from the CN 506 in the QoS policy. The UP-GW determination circuitry 2246 may operate in coordination with UP-GW determination software 2266.

The processor 2204 may further include QoS circuitry 2247 configured for applying a QoS policy to a flow between a CN 506 and a UE 502. For example, the QoS circuitry may apply a QoS policy by controlling one or more parameters of a flow based on the QoS policy, including but not limited to an uplink or downlink bit rate, a guaranteed bit rate, packet filtering (e.g., determining to allow or block packets based on their content), prioritizing a flow, etc. The QoS circuitry 2247 may operate in coordination with QoS software 2267.

Figure 23:
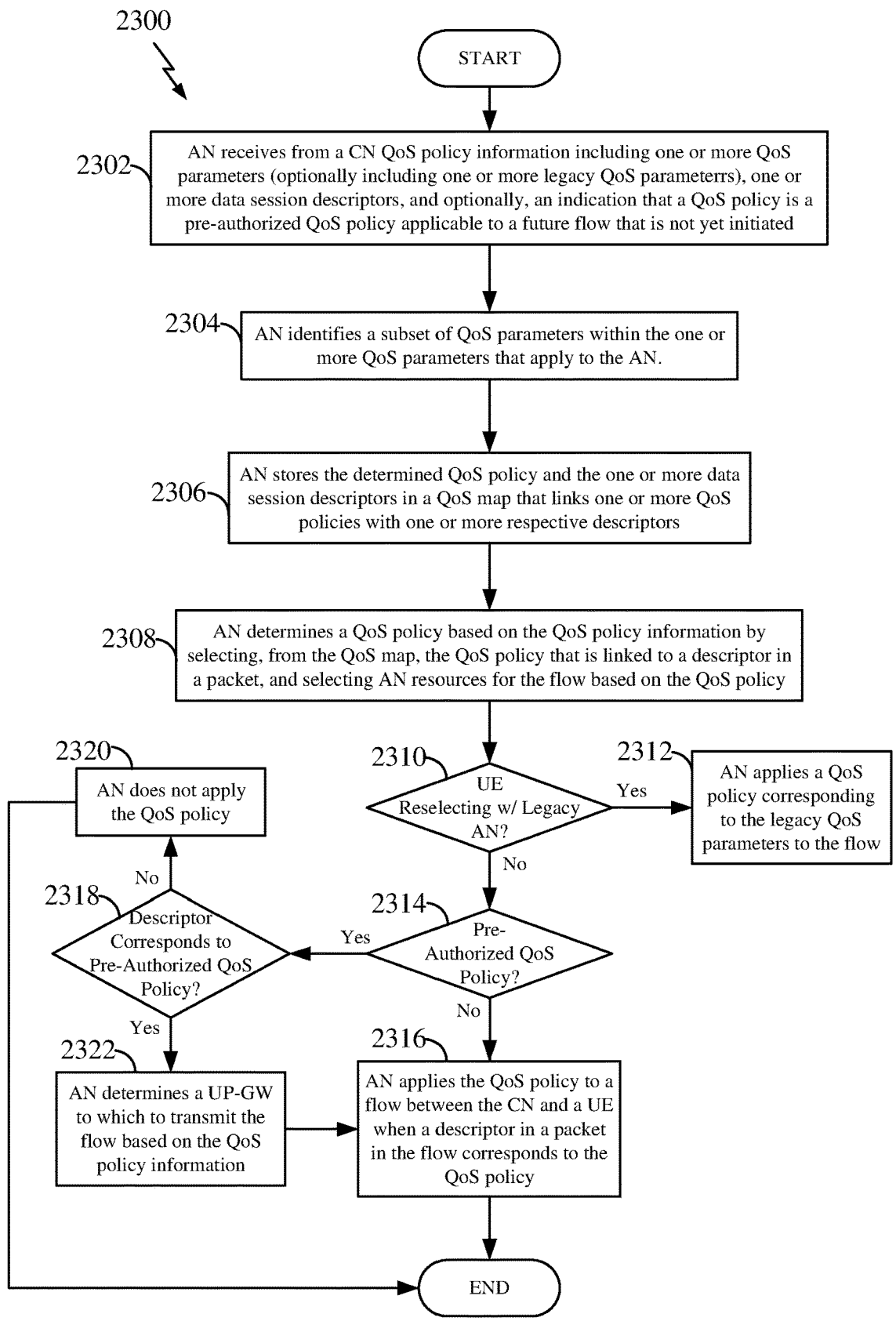
FIG. 23 is a flow chart illustrating an exemplary process for QoS management operable at an access network node.

FIG. 23 is a flow chart illustrating an exemplary process 2300 for managing QoS in a data network. In some examples, the process 2300 may be implemented by the access network node 504 (e.g., a base station in a wireless communication network) described above and illustrated in FIG. 1, 2, 4-20, or 22. In some examples, the process 2300 may be implemented by the processor 2204 and/or the processing system 2214 described above and illustrated in FIG. 22. In other examples, the process 2300 may be implemented by any suitable apparatus or means for carrying out the described functions.

At block 2302, the AN 504 receives, from a CN 506 (e.g., utilizing transceiver 2210), QoS policy information including one or more QoS parameters, and optionally, one or more legacy QoS parameters (e.g., one or more QoS parameters corresponding to a network other than the network implementing the QoS policy). The QoS policy information further includes one or more data session descriptors, and optionally, an indication that a QoS policy is a pre-authorized QoS policy applicable to a future flow that is not yet initiated.

At block 2304, the AN 504 identifies a subset of QoS parameters that apply to the AN 504 within the one or more QoS parameters received in the QoS policy information. For example, the AN 504 may refer to relevant QoS parameters 2253 stored in memory 2205.

At block 2306, the AN 504 stores the determined QoS policy and the one or more data session descriptors in a QoS map 2251 in memory 2205. The QoS map 2251 links one or more QoS policies with one or more respective descriptors.

At block 2308, the AN 504 determines a QoS policy (e.g., utilizing QoS/bearer mapping circuitry 2244) based on the QoS policy information by selecting, from the QoS map 2251, the QoS policy that is linked to a descriptor in a packet and selecting AN resources for the flow based on the determined QoS policy.

At block 2310, the AN 504 may determine (e.g., utilizing legacy QoS handling circuitry 2241) whether the UE 502 is reselecting with a legacy AN. If reselecting, then at block 2312 the AN 504 may apply a QoS policy corresponding to the legacy QoS parameters to the flow. If not reselecting, then at block 2314 the AN 504 may determine whether the QoS policy information indicates that the QoS policy is a pre-authorized QoS policy applicable to a future flow that is not yet initiated at the time of the determining of the QoS policy. If not dealing with a pre-authorized QoS policy, then at block 2316 the AN 504 may apply the determined QoS policy to a flow between the CN 506 and a UE 502 when a descriptor in a packet in the flow corresponds to the determined QoS policy.

If dealing with a pre-authorized QoS policy, then at block 2318 the AN 504 may determine (e.g., utilizing data session detection circuitry 2243) whether a descriptor in a packet corresponds to the pre-authorized QoS policy. If it does not, then at block 2320 the AN 504 does not apply the pre-authorized QoS policy to the flow. If it does correspond to the pre-authorized QoS policy, however, then at block 2322 the AN 504 determines (e.g., utilizing UP-GW determination circuitry 2246) a UP-GW to which to transmit the flow based on the QoS policy information, and applies the pre-authorized QoS policy to the flow when a descriptor in a packet in the flow corresponds to the QoS policy.

Figure 24:
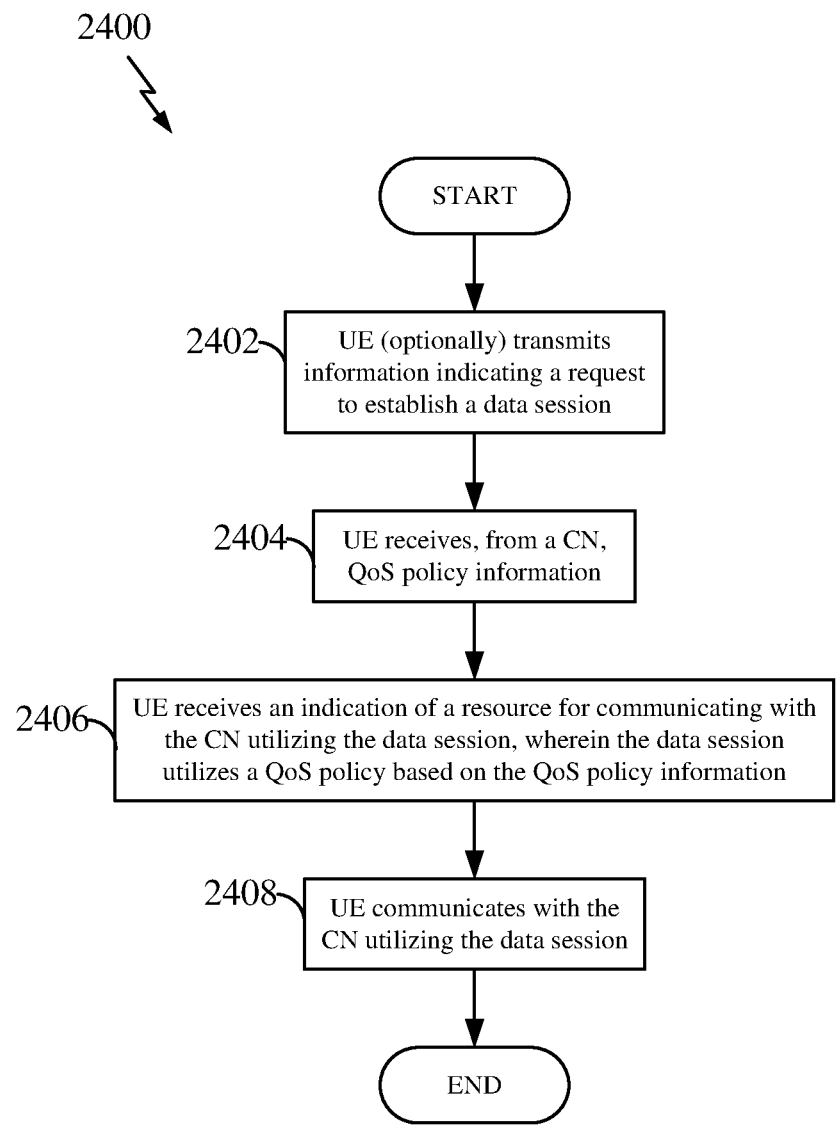
FIG. 24 is a flow chart illustrating an exemplary process for QoS management operable at a UE.

FIG. 24 is a flow chart illustrating an exemplary process 2400 for managing QoS in a data network. In some examples, the process 2400 may be implemented by the UE 502 described above and illustrated in FIG. 1, 2, or 4-21. In some examples, the process 2400 may be implemented by the processor 2104 and/or the processing system 2114 described above and illustrated in FIG. 21. In other examples, the process 2400 may be implemented by any suitable apparatus or means for carrying out the described functions.

At block 2402, the UE 502 may transmit (e.g., utilizing the transceiver 2110 in coordination with a QoS request circuitry 2142) information indicating a request to establish a data session. For example, the UE 502 may transmit an unclassified uplink flow utilizing best-effort delivery, representing an implicit request; or the UE 502 may transmit an explicit QoS request utilizing CP signaling or UP signaling.

At block 2404, the UE 502 receives from a CN 506 (e.g., utilizing transceiver 2110), QoS policy information. At block 2406, the UE 502 receives (e.g., utilizing transceiver 2110) an indication of a resource for communicating with the CN 506 utilizing the data session, wherein the data session utilizes a QoS policy based on the QoS policy information. Finally, the UE 502 communicates (e.g., utilizing the transceiver 2110) with the CN 506 utilizing the established data session.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-24 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of managing quality of service (QoS) in a data network, the method comprising:
   receiving at a user equipment (UE), from a core network (CN), QoS policy information for a data session, wherein the QoS policy information comprises an uplink (UL) token assigned to the data session by the CN that identifies the data session and a QoS policy utilized for the data session;
   receiving at the UE an indication of a resource for communicating with the CN for the data session; and
   transmitting a packet associated with the data session to the CN, wherein the packet comprises the UL token.

2. The method of claim 1, further comprising:
   transmitting information indicating a request to establish the data session; and
   receiving the QoS policy information from the CN in response to the request to establish the data session.

3. The method of claim 1, further comprising:
   transmitting an unclassified uplink flow utilizing best-effort delivery; and
   receiving the QoS policy information classifying the unclassified uplink flow as the data session.

4. The method of claim 1, further comprising:
   transmitting an unclassified uplink flow, the unclassified uplink flow comprising an explicit QoS request; and
   receiving the QoS policy information classifying the unclassified uplink flow as the data session.

5. The method of claim 1, further comprising:
   transmitting an explicit QoS request to the CN utilizing control plane (CP) signaling; and
   receiving the QoS policy information in response to the explicit QoS request.

6. A user equipment (UE) configured for wireless communication in a data network, comprising:
   a processor;
   a memory communicatively coupled to the processor; and
   a transceiver communicatively coupled to the processor and configured for communication with a core network (CN) via an access network (AN) node,
   wherein the processor and the memory are configured to:
      receive, from the CN, quality of service (QoS) policy information for a data session, wherein the QoS policy information comprises an uplink (UL) token assigned to the data session by the CN that identifies the data session and a QoS policy utilized for the data session;
      receive an indication of a resource for communicating with the CN for the data session; and
      transmit a packet associated with the data session to the CN via the transceiver, wherein the packet comprises the UL token.

7. The UE of claim 6, wherein the processor and the memory are further configured to:
   transmit information indicating a request to establish the data session; and
   receive the QoS policy information from the CN in response to the request to establish the data session.

8. The UE of claim 6, wherein the processor and the memory are further configured for:
   transmitting an unclassified uplink flow utilizing best-effort delivery; and
   receiving the QoS policy information classifying the unclassified uplink flow as the data session.

9. The UE of claim 6, wherein the processor and the memory are further configured for:
   transmitting an unclassified uplink flow, the unclassified uplink flow comprising an explicit QoS request; and
   receiving the QoS policy information classifying the unclassified uplink flow as the data session.

10. The UE of claim 6, wherein the processor and the memory are further configured for:
    transmitting an explicit QoS request to the CN utilizing control plane (CP) signaling; and
    receiving the QoS policy information in response to the explicit QoS request.

11. A user equipment (UE) configured for wireless communication in a data network, comprising:
    means for receiving, from a core network (CN), QoS policy information for a data session, wherein the QoS policy information comprises an uplink (UL) token assigned to the data session by the CN that identifies the data session and a QoS policy utilized for the data session;

means for receiving an indication of a resource for communicating with the CN for the data session; and means for transmitting a packet associated with the data session to the CN, wherein the packet comprises the UL token.

12. The UE of claim 11, further comprising:

means for transmitting information indicating a request to establish the data session; and means for receiving the QoS policy information from the CN in response to the request to establish the data session.

13. The UE of claim 11, further comprising:

means for transmitting an unclassified uplink flow utilizing best-effort delivery; and means for receiving the QoS policy information classifying the unclassified uplink flow as the data session.

14. The UE of claim 11, further comprising:

means for transmitting an unclassified uplink flow, the unclassified uplink flow comprising an explicit QoS request; and means for receiving the QoS policy information classifying the unclassified uplink flow as the data session.

15. The UE of claim 11, further comprising:

means for transmitting an explicit QoS request to the CN utilizing control plane (CP) signaling; and means for receiving the QoS policy information in response to the explicit QoS request.

16. A non-transitory computer readable medium storing computer executable code comprising instructions for causing a user equipment (UE) configured for wireless communication in a data network to:

receive, from a core network (CN), quality of service (QoS) policy information for a data session, wherein the QoS policy information comprises an uplink (UL) token assigned to the data session by the CN that identifies the data session and a QoS policy utilized for the data session;

receive an indication of a resource for communicating with the CN for the data session; and transmit a packet associated with the data session to the CN via the transceiver, wherein the packet comprises the UL token.

17. The non-transitory computer readable medium of claim 16, further comprising instructions for causing the UE to:

transmit information indicating a request to establish the data session; and receive the QoS policy information from the CN in response to the request to establish the data session.

18. The non-transitory computer readable medium of claim 16, further comprising instructions for causing the UE to:

transmit an unclassified uplink flow utilizing best-effort delivery; and receive the QoS policy information classifying the unclassified uplink flow as the data session.

19. The non-transitory computer readable medium of claim 16, further comprising instructions for causing the UE to:

transmit an unclassified uplink flow, the unclassified uplink flow comprising an explicit QoS request; and receive the QoS policy information classifying the unclassified uplink flow as the data session.

20. The non-transitory computer readable medium of claim 16, further comprising instructions for causing the UE to:

transmit an explicit QoS request to the CN utilizing control plane (CP) signaling; and receive the QoS policy information in response to the explicit QoS request.

* * * * *